(12) United States Patent
Li et al.

(10) Patent No.: US 11,966,014 B2
(45) Date of Patent: Apr. 23, 2024

(54) OPTICAL IMAGING LENS GROUP

(71) Applicant: ZHEJIANG SUNNY OPTICAL CO., LTD., Ningbo (CN)

(72) Inventors: Long Li, Ningbo (CN); Saifeng Lyu, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 874 days.

(21) Appl. No.: 17/009,123

(22) Filed: Sep. 1, 2020

(65) Prior Publication Data
US 2020/0393657 A1 Dec. 17, 2020

Related U.S. Application Data

(63) Continuation of application No. PCT/CN2019/078962, filed on Mar. 21, 2019.

(30) Foreign Application Priority Data

Jul. 5, 2018 (CN) .......................... 201810730897.1

(51) Int. Cl.
*G02B 13/00* (2006.01)
*G02B 9/64* (2006.01)
*G02B 27/00* (2006.01)

(52) U.S. Cl.
CPC .......... *G02B 13/0045* (2013.01); *G02B 9/64* (2013.01); *G02B 27/0025* (2013.01)

(58) Field of Classification Search
CPC .. G02B 13/0045; G02B 9/64; G02B 27/0025; G02B 13/18
See application file for complete search history.

(56) References Cited

U.S. PATENT DOCUMENTS

2014/0009843 A1* 1/2014 Tsai ..................... H04N 23/55
359/708

FOREIGN PATENT DOCUMENTS

| CN | 202886720 U | 4/2013 |
| CN | 203941337 U | 11/2014 |

(Continued)

OTHER PUBLICATIONS

International Search Report in Corresponding International Application No. PCT/CN2019/078962, dated Mar. 18, 2019; 8 pgs.

(Continued)

*Primary Examiner* — Marin Pichler
*Assistant Examiner* — Justin W. Hustoft
(74) *Attorney, Agent, or Firm* — HAUPTMAN HAM, LLP

(57) ABSTRACT

An optical imaging lens group includes, sequentially from an object side to an image side along an optical axis, a first lens, a second lens, a third lens, a fourth lens, a fifth lens, a sixth lens and a seventh lens. The first lens has positive refractive power, and both an object-side surface and an image-side surface thereof are convex; the second lens has refractive power, and an object-side surface thereof is convex; the third lens has refractive power, and an object-side surface thereof is concave; the fourth lens has refractive power; the fifth lens has refractive power; the sixth lens has refractive power, and an object-side surface thereof is convex; and the seventh lens has negative refractive power. An edge thickness ET6 of the sixth lens and a center thickness CT6 of the sixth lens along the optical axis satisfy $0.2 < ET6/CT6 < 0.9$.

19 Claims, 14 Drawing Sheets

(56) References Cited

FOREIGN PATENT DOCUMENTS

| CN | 105301746 A |   | 2/2016 |
|----|-------------|---|--------|
| CN | 107621681 A |   | 1/2018 |
| CN | 107976784 A |   | 5/2018 |
| CN | 108535848 A |   | 9/2018 |
| CN | 208521051 U |   | 2/2019 |
| JP | 2015072403 A | * | 4/2015 |
| JP | 2015072403 A |   | 4/2015 |

OTHER PUBLICATIONS

International Search Report from corresponding International Application No. PCT/CN2019/078962, dated Jun. 19, 2019, pp. 1-6, China National Intellectual Property Administration, Beijing, China.

* cited by examiner

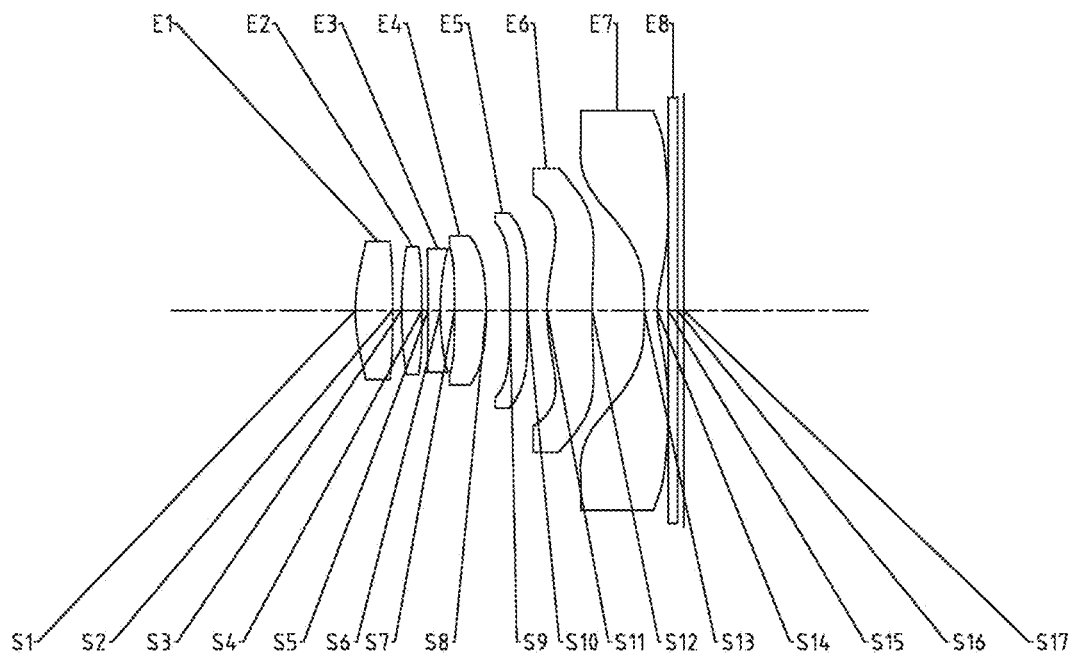
Fig. 1
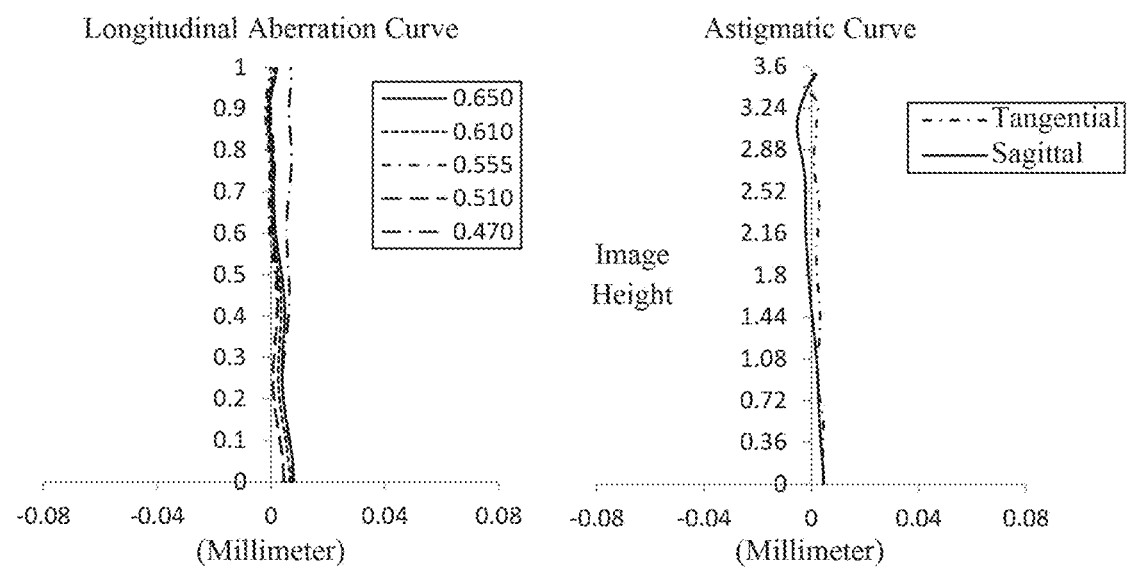
Fig. 2A                    Fig. 2B

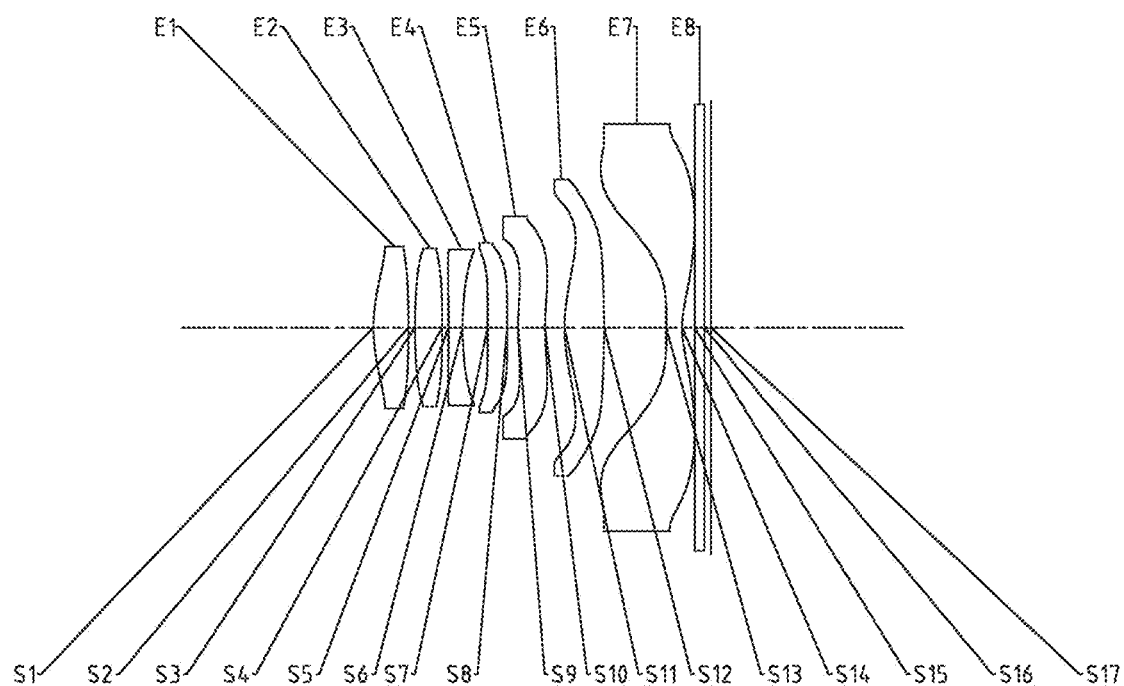
Fig. 5
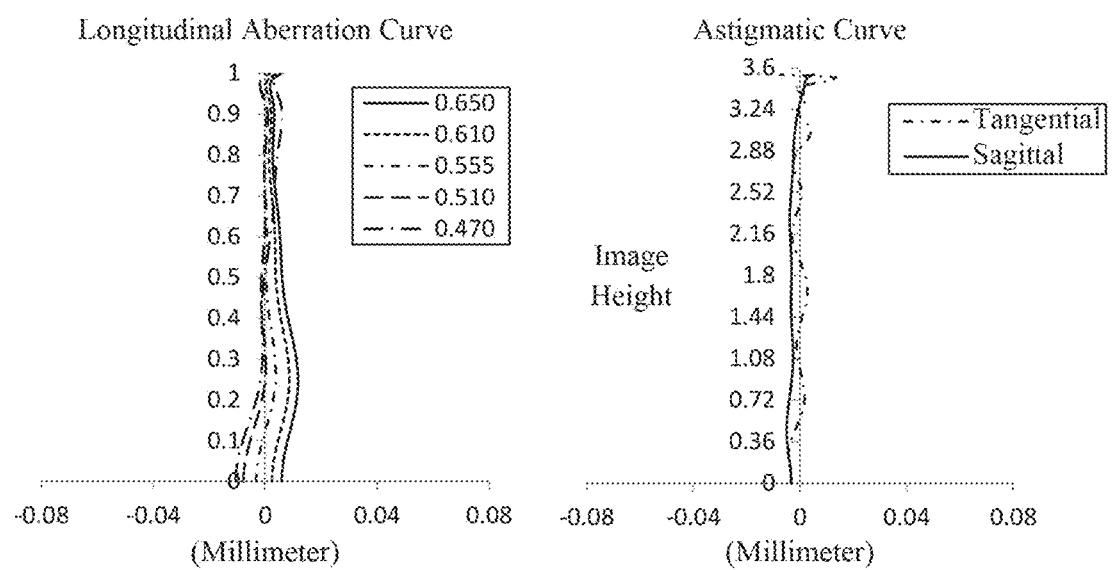
Fig. 6A
Fig. 6B

OPTICAL IMAGING LENS GROUP

CROSS-REFERENCE TO RELATED APPLICATIONS

The present patent application is a continuation of International Application No. PCT/CN2019/078962, filed on Mar. 21, 2019, which claims priority to Chinese Patent Application No. 201810730897.1, filed before the China National Intellectual Property Administration (CNIPA) on Jul. 5, 2018. Both of the aforementioned patent applications are hereby incorporated by reference in their entireties.

TECHNICAL FIELD

The present disclosure relates to an optical imaging lens group, and more specifically, relates to an optical imaging lens group including seven lenses.

BACKGROUND

In recent years, with the ultra-thin trend of portable electronic products, such as smart phones, higher and higher demands are put forward on the lightness and thinness of the optical lens assemblies mounted on the portable electronic products. However, traditional optical lens assemblies with better image quality usually have a large structural size, and the reduction of the structural size of the optical lens assembly by conventional means usually comes at the expense of the image quality of the lens assembly. Therefore, how to reduce the size structure and improve the image quality of the lens assembly on the basis of the traditional lens assembly structure is a major problem in the field of the design of the mobile phone lens.

SUMMARY

The present disclosure provides an optical imaging lens group that is applicable to portable electronic products and at least solves or partially addresses at least one of the above disadvantages of the prior art.

In one aspect, the present disclosure provides an optical imaging lens group which includes, sequentially from an object side to an image side along an optical axis, a first lens, a second lens, a third lens, a fourth lens, a fifth lens, a sixth lens and a seventh lens. The first lens may have positive refractive power, and both of an object-side surface and an image-side surface thereof may be convex surfaces; the second lens has refractive power, and an object-side surface thereof may be a convex surface; the third lens has refractive power, and an object-side surface thereof may be a concave surface; the fourth lens has refractive power; the fifth lens has refractive power; the sixth lens has refractive power, and an object-side surface thereof may be a convex surface; and the seventh lens may have negative refractive power.

In one embodiment, an edge thickness ET6 of the sixth lens and a center thickness CT6 of the sixth lens along the optical axis may satisfy 0.2<ET6/CT6<0.9.

In one embodiment, an effective focal length f7 of the seventh lens and a radius of curvature R14 of an image-side surface of the seventh lens may satisfy −2.5<f7/R14<−1.0.

In one embodiment, a radius of curvature R11 of the object-side surface of the sixth lens and a radius of curvature R3 of the object-side surface of the second lens may satisfy 0<R11/R3<1.

In one embodiment, a radius of curvature R2 of the image-side surface of the first lens and a radius of curvature R5 of the object-side surface of the third lens may satisfy |(R2−R5)/(R2+R5)|<1.

In one embodiment, a total effective focal length f of the optical imaging lens group and a radius of curvature R1 of the object-side surface of the first lens may satisfy 1<f/R1<2.

In one embodiment, an effective focal length f1 of the first lens and a spaced interval T67 between the sixth lens and the seventh lens along the optical axis may satisfy 4<f1/T67<10.

In one embodiment, a center thickness CT4 of the fourth lens along the optical axis and a center thickness CT5 of the fifth lens along the optical axis may satisfy 0.5<CT4 ΣCT5<2.

In one embodiment, a maximum effective radius DT71 of an object-side surface of the seventh lens and a maximum effective radius DT11 of the object-side surface of the first lens may satisfy 1.5<DT71/DT11<2.5.

In one embodiment, a spaced interval T56 between the fifth lens and the sixth lens along the optical axis and a center thickness CT6 of the sixth lens along the optical axis may satisfy 0.2<T56/CT6<0.8.

In one embodiment, a total effective focal length f of the optical imaging lens group and an entrance pupil diameter EPD of the optical imaging lens group may satisfy f/EPD<2.0.

In one embodiment, a center thickness CT7 of the seventh lens along the optical axis and an edge thickness ET7 of the seventh lens may satisfy 0.1<CT7/ET7<0.4.

In one embodiment, a total effective focal length f of the optical imaging lens group, an effective focal length f4 of the fourth lens and an effective focal length f5 of the fifth lens may satisfy |f/f4|+|f/f5|<0.7.

In one embodiment, the third lens may have negative refractive power.

In one embodiment, a spaced interval TTL along the optical axis from the object-side surface of the first lens to an imaging plane of the optical imaging lens group and half of a diagonal length ImgH of an effective pixel area on the imaging plane of the optical imaging lens group may satisfy TTL/ImgH≤1.6.

In one embodiment, a sum of the center thicknesses ΣCT of the first lens to the seventh lens along the optical axis and a spaced interval TTL along the optical axis from the object-side surface of the first lens to an imaging plane of the optical imaging lens group may satisfy 0.4<ΣCT/TTL<0.7.

In one embodiment, a maximum field-of-view FOV of the optical imaging lens group may satisfy 75°<FOV<85°.

The present disclosure employs a plurality of lenses (for example, seven lenses), and the optical imaging lens group has at least one advantageous effect such as ultra-thinness, miniaturization, large aperture, and high image quality and the like by rationally assigning the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 1 illustrates a schematic structural view of an optical imaging lens group according to Example 1 of the present disclosure;

FIGS. 2A to 2D illustrate a longitudinal aberration curve, an astigmatic curve, a distortion curve, and a lateral color curve of the optical imaging lens group of the Example 1, respectively;

FIG. 5 illustrates a schematic structural view of an optical imaging lens group according to Example 3 of the present disclosure;

FIGS. 6A to 6D illustrate a longitudinal aberration curve, an astigmatic curve, a distortion curve, and a lateral color curve of the optical imaging lens group of the Example 3, respectively;

DETAILED DESCRIPTION OF EMBODIMENTS

Figure 2C:
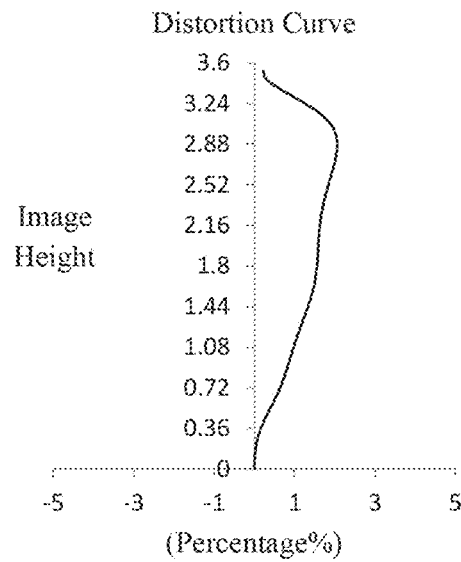

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples. The features, principles, and other aspects of the present disclosure are described in detail below.

An optical imaging lens group according to an exemplary embodiment of the present disclosure may include, for example, seven lenses having refractive power, which are a first lens, a second lens, a third lens, a fourth lens, a fifth lens, a sixth lens and a seventh lens. The seven lenses are arranged sequentially from an object side to an image side along an optical axis. Among the first lens to the seventh lens, there may be an air interval between each two adjacent lenses.

In an exemplary embodiment, the first lens may have positive refractive power, an object-side surface thereof may be a convex surface, and an image-side surface thereof may be a convex surface; the second lens has positive or negative refractive power, and an object-side surface thereof may be a convex surface; the third lens has positive or negative refractive power, and an object-side surface thereof may be a concave surface; the fourth lens has positive or negative refractive power; the fifth lens has positive or negative refractive power; the sixth lens has positive or negative refractive power, and an object-side surface thereof may be a convex surface; and the seventh lens may have negative refractive power.

In an exemplary embodiment, the third lens may have negative refractive power. By reasonably configuring the refractive power of the lens group, the excessive concentration of the refractive power is avoided. When the refractive power of the third lens is configured as negative refractive power, the aberration of the entire system may be effectively reduced, the sensitivity of the system is reduced, and the yield of the system is improved, which is beneficial to the subsequent structural adjustment and processing technology of the system.

In an exemplary embodiment, the optical imaging lens group according to the present disclosure may satisfy: f/EPD<2.0, where f is a total effective focal length of the optical imaging lens group, and EPD is an entrance pupil diameter of the optical imaging lens group. More specifically, f and EPD may further satisfy: 1.50≤f/EPD≤1.84. By satisfying the conditional expression f/EPD≤2.0, and more specifically, by satisfying the conditional expression 1.50≤f/EPD≤1.84, the amount of light passing through the lens group per unit time may be effectively increased, so that the lens group has a high relative illumination, and thus the image quality of the lens group in a darker environment may be better improved.

In an exemplary embodiment, the optical imaging lens group according to the present disclosure may satisfy: 4<f1/T67<10, where f1 is an effective focal length of the first lens, and T67 is a spaced interval between the sixth lens and the seventh lens along the optical axis. More specifically, f1 and T67 may further satisfy: 4.07≤f1/T67≤9.59. By reasonably controlling the ratio of f1 and T67, the size of the lens group may be effectively reduced. The first lens with positive refractive power and the seventh lens with negative refractive power may effectively reduce the aberration of the edge field-of-view while increasing the amount of light enters. At the same time, the first lens has positive refractive power, which is beneficial to the assignment of the refractive power of the entire lens group, so as to avoid excessive concentration of the refractive power, and thus the vertical and lateral chromatic aberration of the lens group are advantageously compensated.

In an exemplary embodiment, an image-side surface of the seventh lens may be a concave surface. An effective focal length f7 of the seventh lens and a radius of curvature R14 of an image-side surface of the seventh lens may satisfy −2.5<f7/R14<−1.0. More specifically, f7 and R14 may further satisfy: −2.26≤f7/R14≤−1.30. By reasonably controlling the effective focal length of the seventh lens and the radius of curvature of the image-side surface of the seventh lens, the astigmatic and coma contribution of the seventh lens may be within a reasonable range, and the astigmatic and coma generated by the seventh lens may effectively compensate the remaining astigmatic and coma generated by the front end lenses (the first to sixth lenses) after offset, so that the lens group has a better image quality.

In an exemplary embodiment, the optical imaging lens group according to the present disclosure may satisfy: TTL/ImgH≤1.6, where TTL is a distance along the optical axis from the object-side surface of the first lens to an imaging plane of the optical imaging lens group, and ImgH is half of a diagonal length of an effective pixel area on the imaging plane of the optical imaging lens group. More specifically, TTL and ImgH may further satisfy: 1.41≤TTL/ImgH≤1.60. When the conditional expression TTL/ImgH≤1.6 is satisfied, the total size of the lens group may be effectively reduced, and the ultra-thin characteristic and miniaturization of the lens group may be achieved, so that the lens group may be better adapted to more and more ultra-thin electronic products in the market.

In an exemplary embodiment, the optical imaging lens group according to the present disclosure may satisfy: 0<R11/R3<1, where R11 is a radius of curvature of the object-side surface of the sixth lens, and R3 is a radius of curvature of the object-side surface of the second lens. More specifically, R11 and R3 may further satisfy: 0.12≤R11/R3≤0.94. By reasonably controlling the radius of curvature of the object-side surface of the sixth lens and the radius of curvature of the object-side surface of the second lens, the astigmatic and coma of the sixth lens and the second lens may be effectively compensated, so that the lens group maintains a better image quality.

In an exemplary embodiment, the optical imaging lens group according to the present disclosure may satisfy: |(R2−R5)/(R2+R5)|<1, where R2 is a radius of curvature of the image-side surface of the first lens, and R5 is a radius of curvature of the object-side surface of the third lens. More specifically, R2 and R5 may further satisfy: 0<|(R2−R5)/(R2+R5)|<1, for example, 0.05≤|(R2−R5)/(R2+R5)|≤0.83. By reasonably distributing the radius of curvature of the image-side surface of the first lens and the radius of curvature of the object-side surface of the third lens, it is beneficial to compensate the various aberrations of the system, thereby correcting system aberrations to improve the image quality.

In an exemplary embodiment, the optical imaging lens group according to the present disclosure may satisfy: 1<f/R1<2, where f is a total effective focal length of the optical imaging lens group, and R1 is a radius of curvature of the object-side surface of the first lens. More specifically, f and R1 may further satisfy: 1.38≤f/R1≤1.68. By reasonably controlling the total effective focal length of the system and the radius of curvature of the object-side surface of the first lens, a large field-of-view and a long back focus of the system may be achieved without causing excessive aberration. At the same time, satisfying the conditional expression 1<f/R1<2 may also effectively reduce the tolerance sensitivity of the first lens, which is beneficial to ensure the lens manufacturing yield in subsequent process.

In an exemplary embodiment, the optical imaging lens group according to the present disclosure may satisfy: 0.5<CT4 ΣCT5<2, where CT4 is a center thickness of the fourth lens along the optical axis, and CT5 is a center thickness of the fifth lens along the optical axis. More specifically, CT4 and CT5 may further satisfy: 0.56≤CT4 ΣCT5≤1.82. By reasonably controlling the center thicknesses of the fourth lens and the fifth lens, the lens group may have a better ability to compensate chromatic aberration without making the fifth lens too thin to cause difficulties in processing.

In an exemplary embodiment, the optical imaging lens group according to the present disclosure may satisfy: $0.4<\Sigma CT/TTL<0.7$, where $\Sigma CT$ is a sum of the center thicknesses of the first lens to the seventh lens along the optical axis, and TTL is a distance along the optical axis from the object-side surface of the first lens to an imaging plane of the optical imaging lens group. More specifically, $\Sigma CT$ and TTL may further satisfy: $0.49 \leq \Sigma CT/TTL \leq 0.61$. By reasonably controlling the ratio of $\Sigma CT$ to TTL, the center thickness of each lens in the system and the interval between lenses may be reasonably distributed, and the chromatic aberration and distortion may be better compensated while ensuring the ultra-thin characteristic of the system. At the same time, satisfying the conditional expression $0.4<\Sigma CT/TTL<0.7$ is beneficial to avoid the problem of processing difficulties caused by the lens being too thin.

In an exemplary embodiment, the optical imaging lens group according to the present disclosure may satisfy: $1.5<DT71/DT11<2.5$, where DT71 is a maximum effective radius of an object-side surface of the seventh lens, and DT11 is a maximum effective radius of the object-side surface of the first lens. More specifically, DT71 and DT11 may further satisfy: $1.96 \leq DT71/DT11 \leq 2.42$. By reasonably controlling the effective radius of the object-side surface of the seventh lens and the effective radius of the object-side surface of the first lens, the amount of light enters the lens group per unit time may be effectively increased, so that the relative illumination of each field-of-view of the system (especially the edge field-of-view) may be improved, thereby making the system have better image quality even in a dark environment.

In an exemplary embodiment, the optical imaging lens group according to the present disclosure may satisfy: $75°<FOV<85°$, where FOV is a maximum field-of-view of the optical imaging lens group. More specifically, FOV may further satisfy: $76.3° \leq FOV \leq 84.2°$. By adjusting the FOV, the image height of the system may be increased while avoiding excessive aberration in the edge field-of-view, which is beneficial to better maintain the system with a wider image range and a higher image quality.

In an exemplary embodiment, the optical imaging lens group according to the present disclosure may satisfy: $0.2<T56/CT6<0.8$, where T56 is a spaced interval between the fifth lens and the sixth lens along the optical axis, and CT6 is a center thickness of the sixth lens along the optical axis. More specifically, T56 and CT6 may further satisfy: $0.23 \leq T56/CT6 \leq 0.76$. By reasonably controlling the spaced interval between the fifth lens and the sixth lens and the center thickness of the sixth lens, the risk of ghost images generated by the system may be effectively reduced, and the size of the lens group may be advantageously reduced.

In an exemplary embodiment, the optical imaging lens group according to the present disclosure may satisfy: $0.2<ET6/CT6<0.9$, where ET6 is an edge thickness of the sixth lens, and CT6 is a center thickness of the sixth lens along the optical axis. More specifically, ET6 and CT6 may further satisfy: $0.29 \leq ET6/CT6 \leq 0.89$. Reasonably adjusting the structural size of the sixth lens may compensate the distortion of the system while reducing the size of the system and maintaining good processability.

In an exemplary embodiment, the optical imaging lens group according to the present disclosure may satisfy: $0.1<CT7/ET7<0.4$, where CT7 is a center thickness of the seventh lens along the optical axis, and ET7 is an edge thickness of the seventh lens. More specifically, CT7 and ET7 may further satisfy: $0.17 \leq CT7/ET7 \leq 0.29$. Reasonably adjusting the structural size of the seventh lens may compensate the distortion of the system while reducing the size of the system and maintaining good processability. At the same time, reasonably controlling the center thicknesses of the sixth lens and the seventh lens is beneficial to obtain a better imaging effect.

In an exemplary embodiment, the optical imaging lens group according to the present disclosure may satisfy: $|f/f4|+|f/f5|<0.7$, where f is a total effective focal length of the optical imaging lens group, f4 is an effective focal length of the fourth lens, and f5 is an effective focal length of the fifth lens. More specifically, f, f4 and f5 may further satisfy: $0<|f/f4|+|f/f5|<0.7$, for example, $0.08 \leq |f/f4|+|f/f5| \leq 0.68$. By reasonably distributing the total effective focal length of the lens group and the effective focal lengths of the fourth lens and fifth lens, the size of the lens group may be effectively reduced, so that the ultra-thin characteristic of the lens group is maintained while avoiding the excessive concentration of the refractive power of the system. Reasonably configuring the fourth lens, fifth lens and the front three lenses is beneficial to correct system aberrations, thereby obtaining good imaging results.

In an exemplary embodiment, the optical imaging lens group may further include a stop to improve the image quality of the lens group. For example, the stop may be disposed between the third lens and the fourth lens.

Optionally, the above optical imaging lens group may further include an optical filter for correcting the color deviation and/or a protective glass for protecting the photosensitive element located on an imaging plane.

The optical imaging lens group according to the above embodiments of the present disclosure may employ a plurality of lenses, such as seven lenses as described above. By properly assigning the refractive power of each lens, the surface shape, the center thickness of each lens, and spaced intervals along the optical axis between the lenses, the size and the sensitivity of the lens group may be effectively reduced, and the workability of the lens group may be improved, such that the optical imaging lens group is more advantageous for production processing and may be applied to portable electronic products. The optical imaging lens group configured as described above may also have the characteristics of ultra-thinness, large aperture, and high imaging quality. In addition, the optical imaging lens group of the present disclosure may provide a lower value of TTL/Fno (wherein Fno may be as low as 1.50). At the same time, since the unique lens configuration may provide sufficient space for subsequent adjustments, the related structure and assembly process are more flexible without losing too much imaging quality during the assembly process.

In the embodiments of the present disclosure, at least one of the surfaces of lenses is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality.

However, it will be understood by those skilled in the art that the number of lenses constituting the optical imaging lens group may be varied to achieve the various results and advantages described in this specification without departing from the technical solution claimed by the present disclosure. For example, although the example is described by taking seven lenses as an example, the optical imaging lens group is not limited to include seven lenses. The optical imaging lens group may also include other numbers of lenses if desired. Some specific examples of an optical imaging lens group applicable to the above embodiment will be further described below with reference to the accompanying drawings.

Example 1

An optical imaging lens group according to example 1 of the present disclosure is described below with reference to FIG. 1 to FIG. 2D. FIG. 1 shows a schematic structural view of the optical imaging lens group according to example 1 of the present disclosure.

As shown in FIG. 1, the optical imaging lens group according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a convex surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, the optical imaging lens group of this example may further include a stop STO (not shown) disposed between the third lens and the fourth lens to improve the image quality of the lens group.

Table 1 shows surface type, radius of curvature, thickness, material and conic coefficient of each lens of the optical imaging lens group in example 1, wherein the units for the radius of curvature and the thickness are millimeter (mm).

TABLE 1

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| S1 | Aspheric | 2.8814 | 0.6073 | 1.54 | 55.9 | −6.0678 |
| S2 | Aspheric | −48.4648 | 0.1453 | | | 80.0000 |
| S3 | Aspheric | 7.5915 | 0.3313 | 1.55 | 56.1 | 0.6232 |
| S4 | Aspheric | −36.2027 | 0.1002 | | | 80.0000 |
| S5 | Aspheric | −99.0000 | 0.2000 | 1.67 | 20.4 | 0.0000 |
| S6 | Aspheric | 4.7820 | 0.1311 | | | 4.7489 |
| STO | Spherical | Infinite | 0.1006 | | | |
| S7 | Aspheric | −99.0000 | 0.5159 | 1.55 | 56.1 | 0.0000 |
| S8 | Aspheric | −5.4966 | 0.3860 | | | −10.6174 |
| S9 | Aspheric | −100.0000 | 0.2838 | 1.67 | 20.4 | 0.0000 |
| S10 | Aspheric | 14.6156 | 0.3221 | | | −66.6908 |
| S11 | Aspheric | 2.9050 | 0.7364 | 1.55 | 56.1 | −2.6095 |
| S12 | Aspheric | 23.0123 | 0.8425 | | | 32.0142 |
| S13 | Aspheric | 22.5502 | 0.2161 | 1.54 | 55.9 | 15.8783 |
| S14 | Aspheric | 1.5559 | 0.1814 | | | −8.9310 |
| S15 | Spherical | Infinite | 0.1500 | 1.52 | 64.2 | |
| S16 | Spherical | Infinite | 0.1000 | | | |
| S17 | Spherical | Infinite | | | | |

As can be seen from Table 1, the object-side surface and the image-side surface of any one of the first lens E1 to the seventh lens E7 are aspheric. In this example, the surface shape x of each aspheric lens may be defined by using, but not limited to, the following aspheric formula:

$$x = \frac{ch^2}{1 + \sqrt{1 - (k+1)c^2 h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14, A16, A18 and A20 applicable to each aspheric surface S1 to S14 in example 1.

TABLE 2

| Surface number | A4 | A6 | A8 | A10 | A12 | A14 | A16 | A18 | A20 |
|---|---|---|---|---|---|---|---|---|---|
| S1 | 8.8270E−03 | −1.6100E−02 | 2.8920E−03 | −9.0100E−03 | 1.2733E−02 | −9.7800E−03 | 4.4210E−03 | −1.0400E−03 | 9.7900E−05 |
| S2 | −2.0680E−02 | 2.9090E−03 | −2.8420E−02 | 7.5665E−02 | −1.0160E−01 | 7.7931E−02 | −3.3640E−02 | 7.5450E−03 | −6.8000E−04 |
| S3 | 9.6130E−03 | −2.6580E−02 | 1.2600E−01 | −3.3202E−01 | 5.5167E−01 | −5.7194E−01 | 3.5324E−01 | −1.1753E−01 | 1.6107E−02 |
| S4 | −2.2590E−02 | −2.0680E−02 | 7.4950E−03 | 3.6181E−02 | −1.0213E−01 | 1.2395E−01 | −7.5500E−02 | 2.2610E−02 | −2.6500E−03 |
| S5 | −1.2580E−02 | −3.3300E−03 | −7.0400E−03 | 1.2213E−01 | −3.2483E−01 | 4.3480E−01 | −3.1097E−01 | 1.1236E−01 | −1.6100E−02 |
| S6 | −1.8600E−03 | 2.3740E−02 | −1.3655E−01 | 5.5840E−01 | −1.2917E+00 | 1.7769E+00 | −1.4362E+00 | 6.2975E−01 | −1.1544E−01 |
| S7 | −3.6130E−02 | −5.8550E−02 | 1.7262E−01 | −5.0907E−01 | 8.9989E−01 | −9.7764E−01 | 6.2664E−01 | −2.1105E−01 | 2.8130E−02 |
| S8 | −3.5010E−02 | −3.5230E−02 | 1.9720E−02 | 1.3644E−02 | −9.1490E−02 | 1.3682E−01 | −9.8960E−02 | 3.6290E−02 | −5.4000E−03 |
| S9 | −2.8440E−02 | −5.8670E−02 | 1.7785E−01 | −3.0354E−01 | 3.0603E−01 | −1.9572E−01 | 7.7593E−02 | −1.7130E−02 | 1.5670E−03 |

TABLE 2-continued

| Surface number | A4 | A6 | A8 | A10 | A12 | A14 | A16 | A18 | A20 |
|---|---|---|---|---|---|---|---|---|---|
| S10 | −6.9480E−02 | −4.4440E−02 | 1.8023E−01 | −2.7138E−01 | 2.3740E−01 | −1.3124E−01 | 4.5061E−02 | −8.7300E−03 | 7.2400E−04 |
| S11 | −3.6810E−02 | −3.2490E−02 | 5.1045E−02 | −4.4960E−02 | 2.3548E−02 | −7.5300E−03 | 1.3820E−03 | −1.3000E−04 | 4.4500E−06 |
| S12 | 2.9251E−02 | −5.1590E−02 | 3.7819E−02 | −2.3050E−02 | 9.6240E−03 | −2.5700E−03 | 4.1700E−04 | −3.7000E−05 | 1.3900E−06 |
| S13 | −3.6019E−01 | 2.9279E−01 | −1.6275E−01 | 5.8782E−02 | −1.3440E−02 | 1.9410E−03 | −1.7000E−04 | 8.6400E−06 | −1.9000E−07 |
| S14 | −1.2791E−01 | 8.8994E−02 | −3.7620E−02 | 1.0072E−02 | −1.7400E−03 | 1.9400E−04 | −1.3000E−05 | 5.2800E−07 | −9.0000E−09 |

Table 3 shows effective focal lengths f1 to f7 of respective lens, a total effective focal length f of the optical imaging lens group, a distance TTL along the optical axis from the object-side surface S1 of the first lens E1 to the imaging plane S17, half of a diagonal length ImgH of an effective pixel area on the imaging plane S17 and a maximum field-of-view FOV in example 1.

TABLE 3

| | |
|---|---|
| f1 (mm) | 5.09 |
| f2 (mm) | 11.53 |
| f3 (mm) | −6.84 |
| f4 (mm) | 10.64 |
| f5 (mm) | −19.12 |
| f6 (mm) | 6.01 |
| f7 (mm) | −3.12 |
| f (mm) | 3.97 |
| TTL (mm) | 5.35 |
| ImgH (mm) | 3.53 |
| FOV (°) | 82.8 |

Figure 2D:
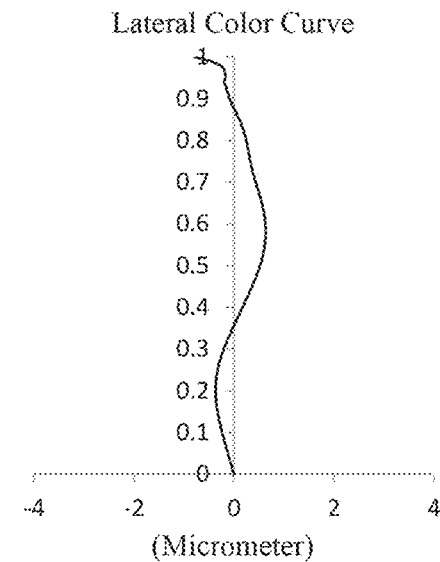

FIG. 2A illustrates a longitudinal aberration curve of the optical imaging lens group according to example 1, representing deviations of focal points converged by light of different wavelengths after passing through the lens assembly. FIG. 2B illustrates an astigmatic curve of the optical imaging lens group according to example 1, representing a curvature of a tangential plane and a curvature of a sagittal plane. FIG. 2C illustrates a distortion curve of the optical imaging lens group according to example 1, representing amounts of distortion corresponding to different image heights. FIG. 2D illustrates a lateral color curve of the optical imaging lens group according to example 1, representing deviations of different image heights on an imaging plane after light passes through the lens assembly. It can be seen from FIG. 2A to FIG. 2D that the optical imaging lens group provided in example 1 may achieve good image quality.

Example 2

Figure 3:
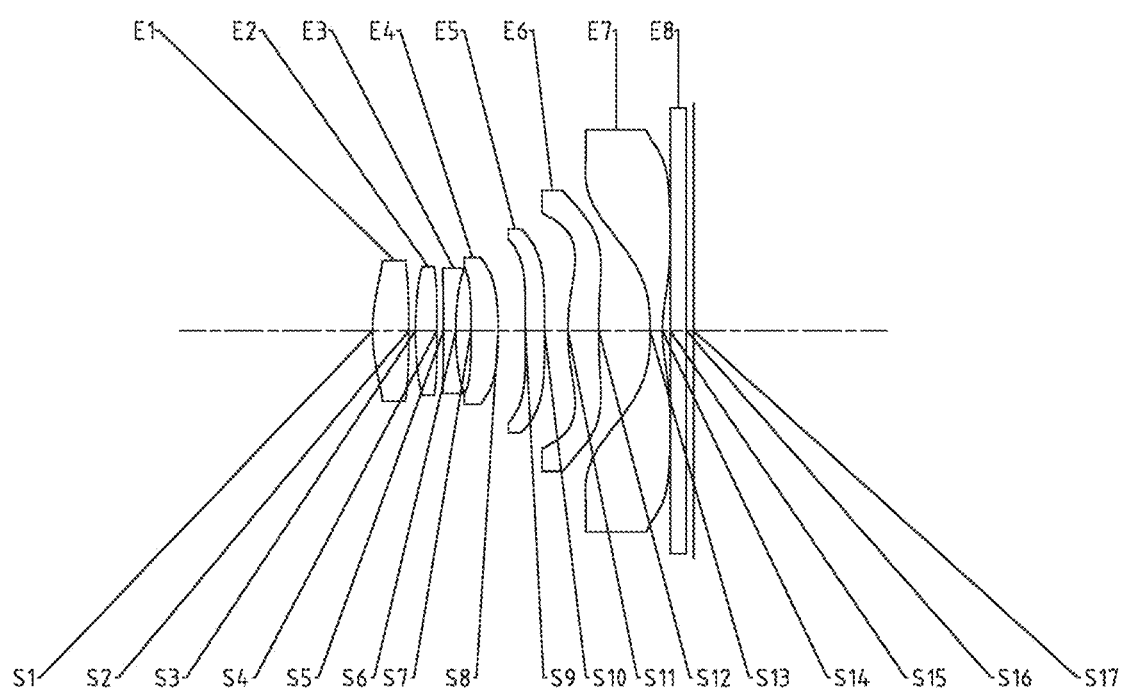
FIG. 3 illustrates a schematic structural view of an optical imaging lens group according to Example 2 of the present disclosure.

An optical imaging lens group according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens group according to example 2 of the present disclosure.

As shown in FIG. 3, the optical imaging lens group according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a convex surface. The second lens E2 has positive refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, the optical imaging lens group of this example may further include a stop STO (not shown) disposed between the third lens and the fourth lens to improve the image quality of the lens group.

Table 4 shows surface type, radius of curvature, thickness, material and conic coefficient of each lens of the optical imaging lens group in example 2, wherein the units for the radius of curvature and the thickness are millimeter (mm). Table 5 shows high-order coefficients applicable to each aspheric surface in example 2, wherein the surface shape of each aspheric surface may be defined by the formula (1) given in the above example 1. Table 6 shows effective focal lengths f1 to f7 of respective lens, a total effective focal length f of the optical imaging lens group, a distance TTL along the optical axis from the object-side surface S1 of the first lens E1 to the imaging plane S17, half of a diagonal length ImgH of an effective pixel area on the imaging plane S17 and a maximum field-of-view FOV in example 2.

TABLE 4

| Surface number | Surface type | Radius of curvature | Thickness | Material | | Conic coefficient |
|---|---|---|---|---|---|---|
| | | | | Refractive index | Abbe number | |
| OBJ | Spherical | Infinite | Infinite | | | |
| S1 | Aspheric | 2.6820 | 0.5645 | 1.54 | 55.9 | −7.2627 |
| S2 | Aspheric | −50.0000 | 0.1037 | | | 80.0000 |
| S3 | Aspheric | 6.0297 | 0.3324 | 1.55 | 56.1 | 6.2159 |
| S4 | Aspheric | 99.0000 | 0.1042 | | | −80.0000 |
| S5 | Aspheric | −99.0000 | 0.1900 | 1.67 | 20.4 | 0.0000 |
| S6 | Aspheric | 4.6116 | 0.1347 | | | 8.4512 |
| STO | Spherical | Infinite | 0.1021 | | | |
| S7 | Aspheric | −99.0000 | 0.4252 | 1.55 | 56.1 | 0.0000 |

TABLE 4-continued

| Surface number | Surface type | Radius of curvature | Thickness | Material Refractive index | Abbe number | Conic coefficient |
|---|---|---|---|---|---|---|
| S8 | Aspheric | −5.6593 | 0.4230 | | | 5.9433 |
| S9 | Aspheric | −99.0000 | 0.2975 | 1.67 | 20.4 | 0.0000 |
| S10 | Aspheric | −39.6396 | 0.3650 | | | −80.0000 |
| S11 | Aspheric | 3.6608 | 0.4816 | 1.55 | 56.1 | −2.4418 |
| S12 | Aspheric | 20.8385 | 0.7992 | | | 80.0000 |
| S13 | Aspheric | −5.0529 | 0.1900 | 1.54 | 55.9 | −80.0000 |
| S14 | Aspheric | 2.1277 | 0.1236 | | | −11.8771 |
| S15 | Spherical | Infinite | 0.2495 | 1.52 | 64.2 | |
| S16 | Spherical | Infinite | 0.1138 | | | |
| S17 | Spherical | Infinite | | | | |

TABLE 5

| Surface number | A4 | A6 | A8 | A10 | A12 | A14 | A16 | A18 | A20 |
|---|---|---|---|---|---|---|---|---|---|
| S1 | 1.1790E−02 | −3.0300E−02 | −5.1000E−04 | 5.4100E−03 | −3.1900E−03 | 2.4780E−03 | −8.8000E−04 | 2.5100E−05 | 2.5300E−05 |
| S2 | −5.3220E−02 | 3.4095E−02 | −3.4320E−02 | 6.9785E−02 | −1.1272E−01 | 1.0832E−01 | −5.7200E−02 | 1.5278E−02 | −1.6100E−03 |
| S3 | −1.6430E−02 | 4.7843E−02 | 1.5612E−02 | −9.8530E−02 | 1.7492E−01 | −2.1788E−01 | 1.6490E−01 | −6.5300E−02 | 1.0360E−02 |
| S4 | −5.1240E−02 | 3.2957E−02 | −7.6200E−02 | 1.4022E−01 | −2.7174E−01 | 3.3520E−01 | −2.1616E−01 | 6.8256E−02 | −8.3800E−03 |
| S5 | −3.5380E−02 | 2.7337E−02 | 1.9567E−01 | −1.0076E+00 | 2.3880E+00 | −3.2847E+00 | 2.7050E+00 | −1.2190E+00 | 2.2781E−01 |
| S6 | −1.0860E−02 | 4.5874E−02 | −3.5890E−02 | 8.7820E−02 | −3.9181E−01 | 8.8706E−01 | −1.0120E+00 | 5.8603E−01 | −1.3758E−01 |
| S7 | −6.3410E−02 | −5.2710E−02 | 8.5084E−02 | −1.0342E−01 | −2.4652E−01 | 9.0239E−01 | −1.1915E+00 | 7.3956E−01 | −1.7535E−01 |
| S8 | −4.7840E−02 | −4.9450E−02 | −2.1700E−02 | 2.6377E−01 | −6.9139E−01 | 9.2694E−01 | −6.9698E−01 | 2.7905E−01 | −4.5890E−02 |
| S9 | 2.5176E−02 | −2.0248E−01 | 3.7245E−01 | −4.9496E−01 | 4.4704E−01 | −2.7643E−01 | 1.1247E−01 | −2.6690E−02 | 2.7370E−03 |
| S10 | 4.2368E−02 | −2.6757E−01 | 4.6094E−01 | −5.1677E−01 | 3.8576E−01 | −1.9319E−01 | 6.2612E−02 | −1.1810E−02 | 9.7500E−04 |
| S11 | 6.3336E−02 | −2.0586E−01 | 2.1448E−01 | −1.5735E−01 | 8.2399E−02 | −3.0190E−02 | 7.1810E−03 | −9.8000E−04 | 5.9000E−05 |
| S12 | 9.5235E−02 | −1.6361E−01 | 1.1817E−01 | −6.0320E−02 | 2.2591E−02 | −6.1200E−03 | 1.1050E−03 | −1.1000E−04 | 5.0900E−06 |
| S13 | −2.7170E−01 | 1.8478E−01 | −9.0330E−02 | 3.1665E−02 | −7.3200E−03 | 1.0810E−03 | −9.8000E−05 | 5.0400E−06 | −1.1000E−07 |
| S14 | −1.0238E−01 | 5.7997E−02 | −1.9900E−02 | 4.6100E−03 | −7.6000E−04 | 8.9200E−05 | −7.3000E−06 | 3.5900E−07 | −7.9000E−09 |

TABLE 6

| | |
|---|---|
| f1 (mm) | 4.76 |
| f2 (mm) | 11.75 |
| f3 (mm) | −6.61 |
| f4 (mm) | 10.98 |
| f5 (mm) | 99.00 |
| f6 (mm) | 8.05 |
| f7 (mm) | −2.76 |
| f (mm) | 3.88 |
| TTL (mm) | 5.00 |
| ImgH (mm) | 3.54 |
| FOV (°) | 84.2 |

Figure 4A:
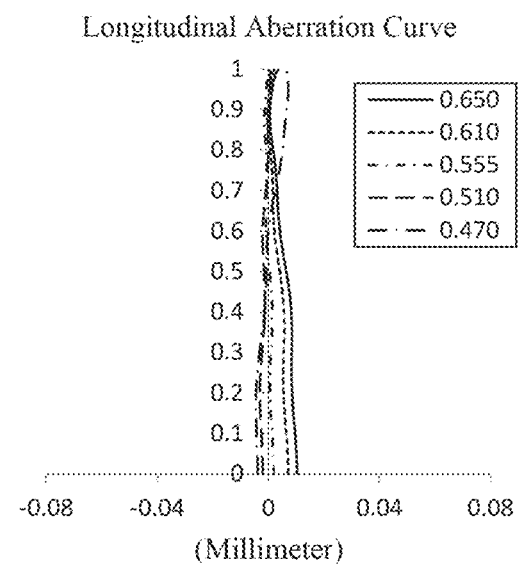
FIGS. 4A to 4D illustrate a longitudinal aberration curve, an astigmatic curve, a distortion curve, and a lateral color curve of the optical imaging lens group of the Example 2, respectively.
Figure 4B:
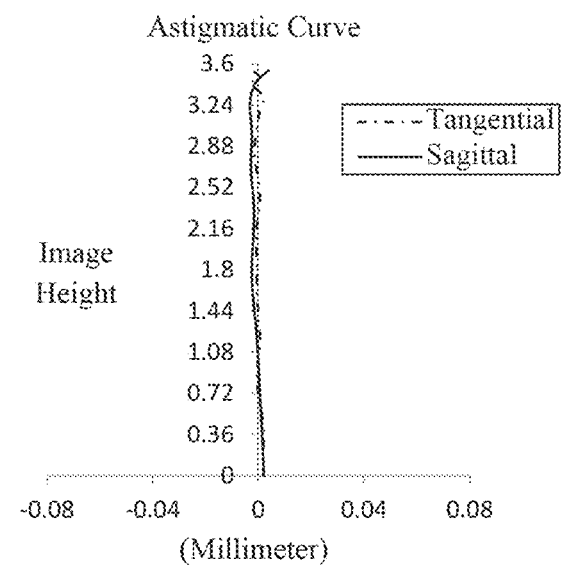
Figure 4C:
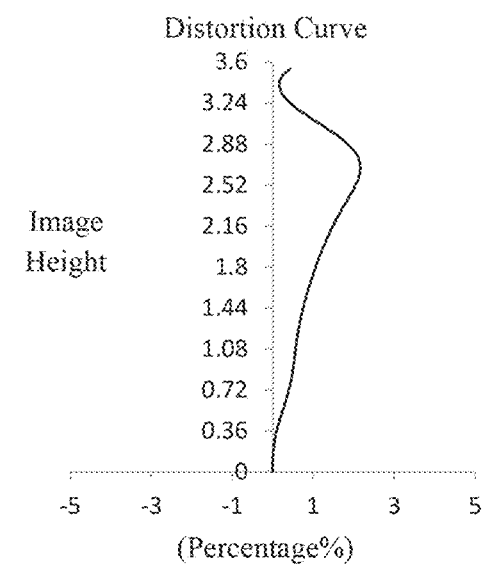
Figure 4D:
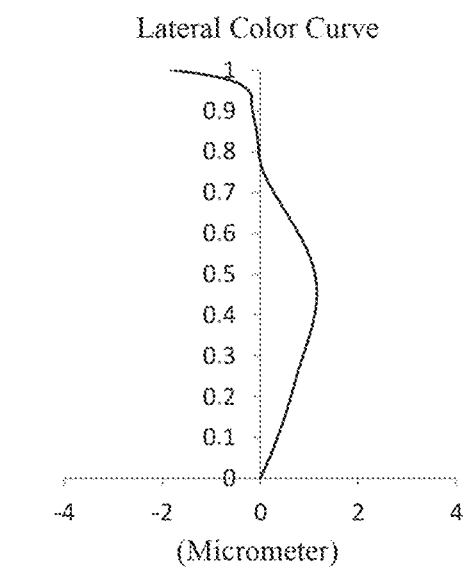

FIG. 4A illustrates a longitudinal aberration curve of the optical imaging lens group according to example 2, representing deviations of focal points converged by light of different wavelengths after passing through the lens assembly. FIG. 4B illustrates an astigmatic curve of the optical imaging lens group according to example 2, representing a curvature of a tangential plane and a curvature of a sagittal plane. FIG. 4C illustrates a distortion curve of the optical imaging lens group according to example 2, representing amounts of distortion corresponding to different image heights. FIG. 4D illustrates a lateral color curve of the optical imaging lens group according to example 2, representing deviations of different image heights on an imaging plane after light passes through the lens assembly. It can be seen from FIG. 4A to FIG. 4D that the optical imaging lens group provided in example 2 may achieve good image quality.

Example 3

An optical imaging lens group according to example 3 of the present disclosure is described below with reference to FIG. 5 to FIG. 6D. FIG. 5 shows a schematic structural view of the optical imaging lens group according to example 3 of the present disclosure.

As shown in FIG. 5, the optical imaging lens group according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a convex surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, the optical imaging lens group of this example may further include a stop STO (not shown) disposed between the third lens and the fourth lens to improve the image quality of the lens group.

Table 7 shows surface type, radius of curvature, thickness, material and conic coefficient of each lens of the optical imaging lens group in example 3, wherein the units for the radius of curvature and the thickness are millimeter (mm). Table 8 shows high-order coefficients applicable to each aspheric surface in example 3, wherein the surface shape of each aspheric surface may be defined by the formula (1)

given in the above example 1. Table 9 shows effective focal lengths f1 to f7 of respective lens, a total effective focal length f of the optical imaging lens group, a distance TTL along the optical axis from the object-side surface S1 of the first lens E1 to the imaging plane S17, half of a diagonal length ImgH of an effective pixel area on the imaging plane S17 and a maximum field-of-view FOV in example 3.

TABLE 7

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | 2.7329 | 0.5410 | 1.54 | 55.9 | −7.0398 |
| S2 | Aspheric | −50.0000 | 0.1031 | | | 80.0000 |
| S3 | Aspheric | 8.2913 | 0.4232 | 1.55 | 56.1 | 10.9432 |
| S4 | Aspheric | −66.0702 | 0.1000 | | | −80.0000 |
| S5 | Aspheric | −100.0000 | 0.2200 | 1.67 | 20.4 | 0.0000 |
| S6 | Aspheric | 5.9436 | 0.2157 | | | 12.4020 |
| STO | Spherical | Infinite | 0.1722 | | | |
| S7 | Aspheric | 49.3896 | 0.3029 | 1.55 | 56.1 | 0.0000 |
| S8 | Aspheric | 25.7508 | 0.1726 | | | −80.0000 |
| S9 | Aspheric | 4.6440 | 0.4177 | 1.67 | 20.4 | 0.0000 |
| S10 | Aspheric | 3.4899 | 0.3044 | | | −50.6473 |
| S11 | Aspheric | 2.6294 | 0.6158 | 1.55 | 56.1 | −1.5460 |
| S12 | Aspheric | −12.6798 | 0.9653 | | | −65.5904 |
| S13 | Aspheric | 15.5194 | 0.2479 | 1.54 | 55.9 | 12.5470 |
| S14 | Aspheric | 1.4979 | 0.1982 | | | −9.0895 |
| S15 | Spherical | Infinite | 0.1500 | 1.52 | 64.2 | |
| S16 | Spherical | Infinite | 0.1000 | | | |
| S17 | Spherical | Infinite | | | | |

TABLE 8

| Surface number | A4 | A6 | A8 | A10 | A12 | A14 | A16 | A18 | A20 |
|---|---|---|---|---|---|---|---|---|---|
| S1 | 1.3284E−02 | −1.2020E−02 | −4.6620E−02 | 8.9803E−02 | −1.0575E−01 | 7.7999E−02 | −3.3580E−02 | 7.7110E−03 | −7.3000E−04 |
| S2 | −3.6890E−02 | −5.4200E−03 | 4.5653E−02 | −9.1480E−02 | 1.1731E−01 | −9.4010E−02 | 4.5522E−02 | −1.2090E−02 | 1.3390E−03 |
| S3 | −1.7270E−02 | 1.0003E−02 | 4.5667E−02 | −8.1180E−02 | 9.6176E−02 | −7.0220E−02 | 2.3907E−02 | −9.0000E−04 | −9.1000E−04 |
| S4 | −5.2710E−02 | −9.0700E−03 | 7.7464E−02 | −1.2781E−01 | 1.3759E−01 | −1.1320E−01 | 6.5371E−02 | −2.1600E−02 | 2.9660E−03 |
| S5 | −1.8170E−02 | −6.9000E−03 | 8.8170E−02 | −1.5492E−01 | 1.5995E−01 | −1.1629E−01 | 6.0941E−02 | −1.8720E−02 | 2.2460E−03 |
| S6 | 1.1669E−02 | −1.5190E−02 | 8.4095E−02 | −1.9376E−01 | 2.7936E−01 | −2.7263E−01 | 1.7306E−01 | −6.3000E−02 | 9.9860E−03 |
| S7 | −4.4240E−02 | 5.8284E−02 | −3.6549E−01 | 9.2872E−01 | −1.4487E+00 | 1.4128E+00 | −8.3355E−01 | 2.6944E−01 | −3.5890E−02 |
| S8 | −1.1323E−01 | 1.8838E−01 | −4.2085E−01 | 5.0941E−01 | −3.6300E−01 | 1.1522E−01 | 2.3575E−02 | −2.9740E−02 | 6.6490E−03 |
| S9 | −2.0040E−01 | 3.1045E−01 | −5.1226E−01 | 6.4212E−01 | −6.3389E−01 | 4.5069E−01 | −2.1138E−01 | 5.8095E−02 | −7.1500E−03 |
| S10 | −9.1340E−02 | 4.1377E−02 | 2.4327E−02 | −9.1450E−02 | 9.5712E−02 | −5.6000E−02 | 1.9692E−02 | −3.9100E−03 | 3.3800E−04 |
| S11 | −8.5010E−02 | 5.8159E−02 | −4.3510E−02 | 2.4324E−02 | −1.1640E−02 | 4.1560E−03 | −9.5000E−04 | 1.1900E−04 | −6.2000E−06 |
| S12 | 1.9642E−02 | −1.8640E−02 | 1.3163E−02 | −1.0410E−02 | 4.4780E−03 | −1.0700E−03 | 1.5000E−04 | −1.2000E−05 | 4.2300E−07 |
| S13 | −3.7057E−01 | 2.9512E−01 | −1.6043E−01 | 5.6470E−02 | −1.2530E−02 | 1.7500E−03 | −1.5000E−04 | 7.2200E−06 | −1.5000E−07 |
| S14 | −1.1291E−01 | 7.3420E−02 | −2.8670E−02 | 7.0400E−03 | −1.1400E−03 | 1.2500E−04 | −9.1000E−06 | 4.0000E−07 | −8.0000E−09 |

TABLE 9

| f1 (mm) | 4.84 |
|---|---|
| f2 (mm) | 13.52 |
| f3 (mm) | −8.41 |
| f4 (mm) | −99.00 |
| f5 (mm) | −24.64 |
| f6 (mm) | 4.05 |
| f7 (mm) | −3.11 |
| f (mm) | 3.94 |
| TTL (mm) | 5.25 |
| ImgH (mm) | 3.54 |
| FOV (°) | 82.4 |

Figure 6C:
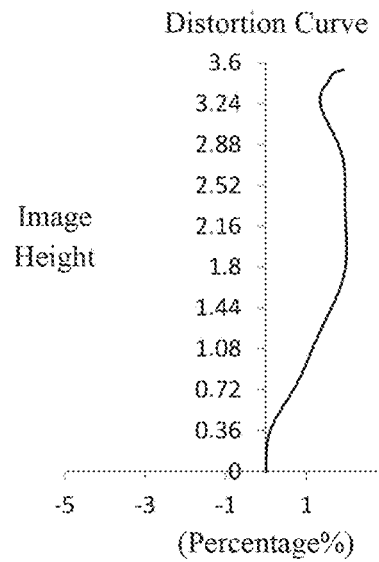
Figure 6D:
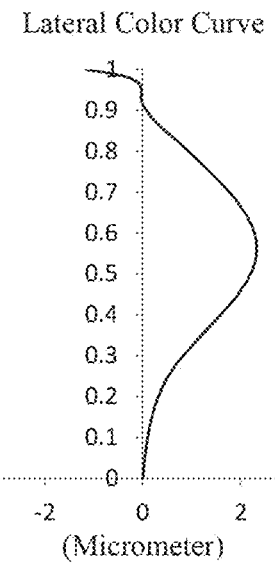

FIG. 6A illustrates a longitudinal aberration curve of the optical imaging lens group according to example 3, representing deviations of focal points converged by light of different wavelengths after passing through the lens assembly. FIG. 6B illustrates an astigmatic curve of the optical imaging lens group according to example 3, representing a curvature of a tangential plane and a curvature of a sagittal plane. FIG. 6C illustrates a distortion curve of the optical imaging lens group according to example 3, representing amounts of distortion corresponding to different image heights. FIG. 6D illustrates a lateral color curve of the optical imaging lens group according to example 3, representing deviations of different image heights on an imaging plane after light passes through the lens assembly. It can be seen from FIG. 6A to FIG. 6D that the optical imaging lens group provided in example 3 may achieve good image quality.

Example 4

Figure 7:
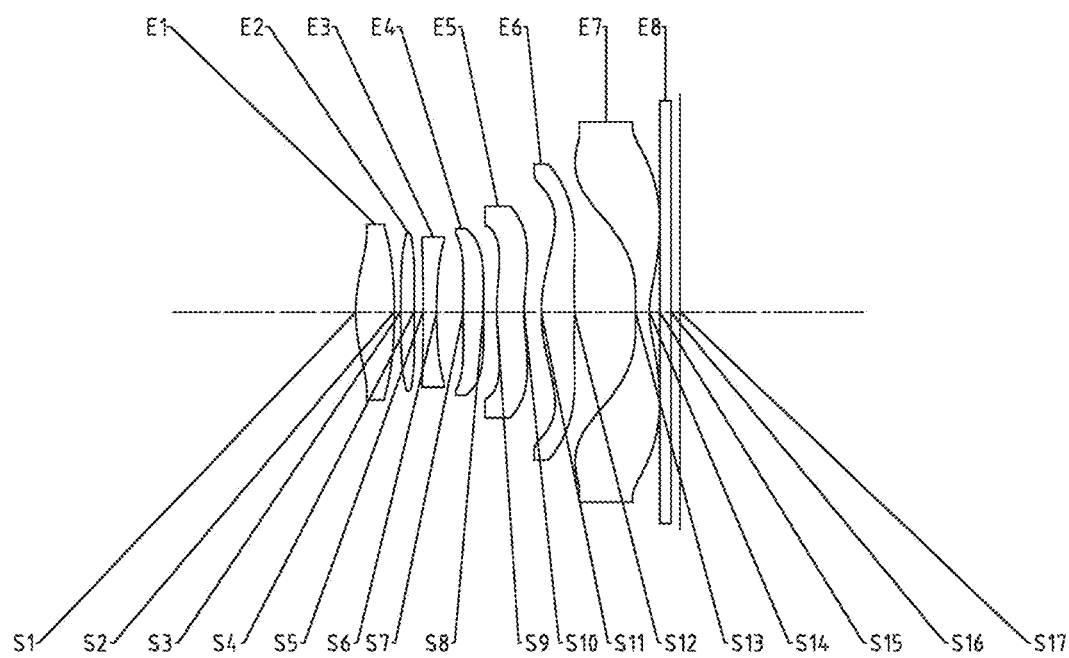
FIG. 7 illustrates a schematic structural view of an optical imaging lens group according to Example 4 of the present disclosure.

An optical imaging lens group according to example 4 of the present disclosure is described below with reference to FIG. 7 to FIG. 8D. FIG. 7 shows a schematic structural view of the optical imaging lens group according to example 4 of the present disclosure.

As shown in FIG. 7, the optical imaging lens group according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, the optical imaging lens group of this example may further include a stop STO (not shown) disposed between the third lens and the fourth lens to improve the image quality of the lens group.

Table 10 shows surface type, radius of curvature, thickness, material and conic coefficient of each lens of the optical imaging lens group in example 4, wherein the units for the radius of curvature and the thickness are millimeter (mm). Table 11 shows high-order coefficients applicable to each aspheric surface in example 4, wherein the surface shape of each aspheric surface may be defined by the formula (1) given in the above example 1. Table 12 shows effective focal lengths f1 to f7 of respective lens, a total effective focal length f of the optical imaging lens group, a distance TTL along the optical axis from the object-side surface S1 of the first lens E1 to the imaging plane S17, half of a diagonal length ImgH of an effective pixel area on the imaging plane S17 and a maximum field-of-view FOV in example 4.

TABLE 10

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | 2.8072 | 0.6285 | 1.54 | 55.9 | −7.3722 |
| S2 | Aspheric | −9.0189 | 0.1043 | | | 12.3862 |
| S3 | Aspheric | 19.9461 | 0.2200 | 1.55 | 56.1 | 76.4794 |
| S4 | Aspheric | 14.5126 | 0.1481 | | | 17.7661 |
| S5 | Aspheric | −100.0000 | 0.2200 | 1.67 | 20.4 | 0.0000 |
| S6 | Aspheric | 8.7589 | 0.2499 | | | 20.7788 |
| STO | Spherical | Infinite | 0.1849 | | | |
| S7 | Aspheric | 30.4131 | 0.3278 | 1.55 | 56.1 | 0.0000 |
| S8 | Aspheric | 19.3879 | 0.2196 | | | −80.0000 |
| S9 | Aspheric | 3.9676 | 0.4480 | 1.67 | 20.4 | 0.0000 |
| S10 | Aspheric | 3.1101 | 0.2799 | | | −36.5522 |
| S11 | Aspheric | 2.4003 | 0.5416 | 1.55 | 56.1 | −1.5550 |
| S12 | Aspheric | −23.5778 | 0.9993 | | | −56.6900 |
| S13 | Aspheric | 18.2550 | 0.2268 | 1.54 | 55.9 | 18.2599 |
| S14 | Aspheric | 1.5450 | 0.1713 | | | −9.1713 |
| S15 | Spherical | Infinite | 0.1800 | 1.52 | 64.2 | |
| S16 | Spherical | Infinite | 0.1500 | | | |
| S17 | Spherical | Infinite | | | | |

TABLE 12

| f1 (mm) | 4.06 |
|---|---|
| f2 (mm) | −99.00 |
| f3 (mm) | −12.07 |
| f4 (mm) | −99.00 |
| f5 (mm) | −27.30 |
| f6 (mm) | 4.02 |
| f7 (mm) | −3.16 |
| f (mm) | 4.01 |
| TTL (mm) | 5.30 |
| ImgH (mm) | 3.54 |
| FOV (°) | 81.4 |

Figure 8A:
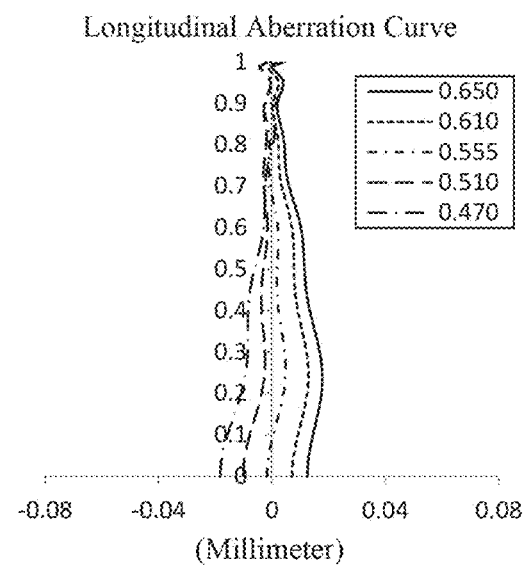
FIGS. 8A to 8D illustrate a longitudinal aberration curve, an astigmatic curve, a distortion curve, and a lateral color curve of the optical imaging lens group of the Example 4, respectively.
Figure 8B:
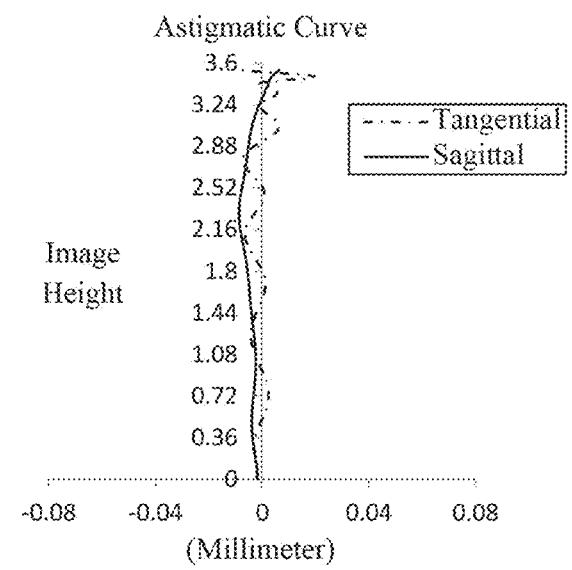
Figure 8C:
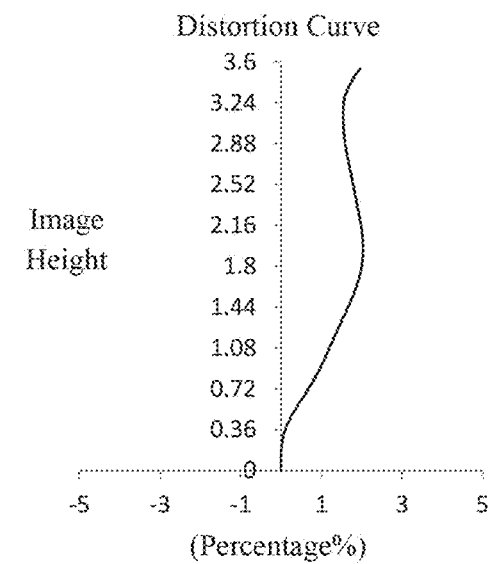
Figure 8D:
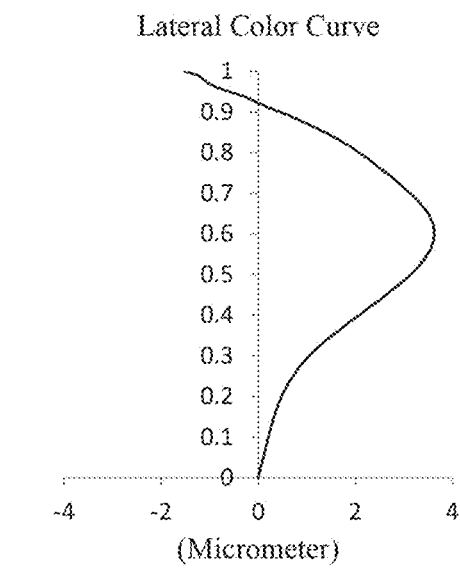

FIG. 8A illustrates a longitudinal aberration curve of the optical imaging lens group according to example 4, representing deviations of focal points converged by light of different wavelengths after passing through the lens assembly. FIG. 8B illustrates an astigmatic curve of the optical imaging lens group according to example 4, representing a curvature of a tangential plane and a curvature of a sagittal plane. FIG. 8C illustrates a distortion curve of the optical imaging lens group according to example 4, representing amounts of distortion corresponding to different image heights. FIG. 8D illustrates a lateral color curve of the optical imaging lens group according to example 4, representing deviations of different image heights on an imaging plane after light passes through the lens assembly. It can be seen from FIG. 8A to FIG. 8D that the optical imaging lens group provided in example 4 may achieve good image quality.

Example 5

Figure 9:
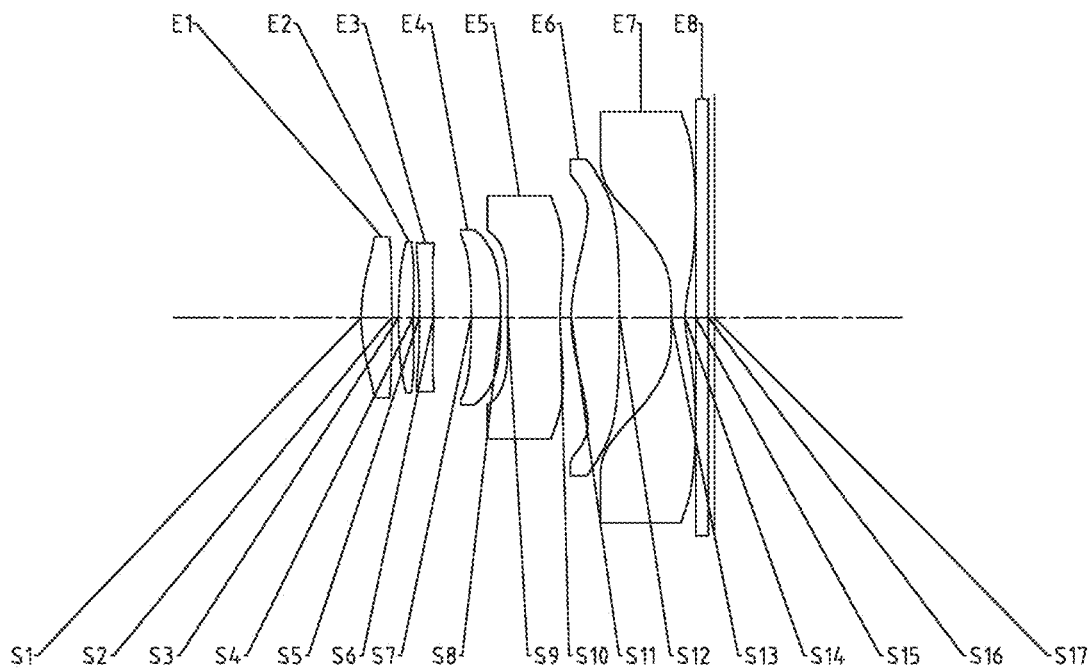
FIG. 9 illustrates a schematic structural view of an optical imaging lens group according to Example 5 of the present disclosure.

An optical imaging lens group according to example 5 of the present disclosure is described below with reference to FIG. 9 to FIG. 10D. FIG. 9 shows a schematic structural view of the optical imaging lens group according to example 5 of the present disclosure.

As shown in FIG. 9, the optical imaging lens group according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-

TABLE 11

| Surface number | A4 | A6 | A8 | A10 | A12 | A14 | A16 | A18 | A20 |
|---|---|---|---|---|---|---|---|---|---|
| S1 | 1.5973E−02 | −2.0190E−02 | −5.5700E−03 | 4.8540E−03 | −4.3000E−04 | −2.7200E−03 | 2.7400E−03 | −1.0400E−03 | 1.4200E−04 |
| S2 | −1.5090E−02 | 9.3380E−03 | −9.2000E−04 | −2.9130E−02 | 5.0006E−02 | −4.0130E−02 | 1.7528E−02 | −3.9800E−03 | 3.6700E−04 |
| S3 | −1.9200E−02 | 5.6898E−02 | −7.5600E−03 | −1.3058E−01 | 2.9565E−01 | −3.2412E−01 | 1.9686E−01 | −6.3890E−02 | 8.7030E−03 |
| S4 | −7.2550E−02 | 2.0076E−02 | 9.0350E−02 | −3.2186E−01 | 5.5370E−01 | −5.5473E−01 | 3.2460E−01 | −1.0292E−01 | 1.3698E−02 |
| S5 | −1.9350E−02 | −1.1100E−03 | 3.6705E−02 | −6.3900E−02 | 8.9080E−02 | −9.2910E−02 | 6.0503E−02 | −2.1170E−02 | 3.0180E−03 |
| S6 | 1.6829E−02 | −9.8000E−04 | −7.4100E−03 | 5.0251E−02 | −9.2340E−02 | 8.6207E−02 | −4.5050E−02 | 1.2485E−02 | −1.4500E−03 |
| S7 | −3.5260E−02 | 4.8190E−02 | −2.7373E−01 | 6.4406E−01 | −9.2915E−01 | 8.4070E−01 | −4.6416E−01 | 1.4326E−01 | −1.9060E−02 |
| S8 | −9.6620E−02 | 1.3491E−01 | −3.1089E−01 | 4.2436E−01 | −4.0420E−01 | 2.6154E−01 | −1.0849E−01 | 2.6135E−02 | −2.8500E−03 |
| S9 | −1.6380E−01 | 2.1982E−01 | −3.5452E−01 | 4.7287E−01 | −5.0514E−01 | 3.7689E−01 | −1.8037E−01 | 4.9568E−02 | −5.9800E−03 |
| S10 | −6.3240E−02 | −1.1260E−02 | 8.6324E−02 | −1.2549E−01 | 9.8163E−02 | −4.7920E−02 | 1.4639E−02 | −2.5700E−03 | 1.9700E−04 |
| S11 | −6.7240E−02 | 3.9361E−02 | −3.4000E−02 | 2.0998E−02 | −9.3900E−03 | 2.8760E−03 | −5.7000E−04 | 6.4200E−05 | −3.1000E−06 |
| S12 | 4.5205E−02 | −2.5140E−02 | 3.6420E−03 | −1.0900E−03 | 1.1180E−03 | −4.9000E−04 | 1.0400E−04 | −1.1000E−05 | 4.5400E−07 |
| S13 | −3.5381E−01 | 2.7849E−01 | −1.5228E−01 | 5.4436E−02 | −1.2290E−02 | 1.7460E−03 | −1.5000E−04 | 7.4500E−06 | −1.6000E−07 |
| S14 | −1.1988E−01 | 8.0380E−02 | −3.4550E−02 | 9.5900E−03 | −1.7700E−03 | 2.1800E−04 | −1.7000E−05 | 7.9800E−07 | −1.6000E−08 | side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, the optical imaging lens group of this example may further include a stop STO (not shown) disposed between the third lens and the fourth lens to improve the image quality of the lens group.

Table 13 shows surface type, radius of curvature, thickness, material and conic coefficient of each lens of the optical imaging lens group in example 5, wherein the units for the radius of curvature and the thickness are millimeter (mm). Table 14 shows high-order coefficients applicable to each aspheric surface in example 5, wherein the surface shape of each aspheric surface may be defined by the formula (1) given in the above example 1. Table 15 shows effective focal lengths f1 to f7 of respective lens, a total effective focal length f of the optical imaging lens group, a distance TTL along the optical axis from the object-side surface S1 of the first lens E1 to the imaging plane S17, half of a diagonal length ImgH of an effective pixel area on the imaging plane S17 and a maximum field-of-view FOV in example 5.

TABLE 13

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | 2.7986 | 0.4883 | 1.54 | 55.9 | −5.9484 |
| S2 | Aspheric | −35.8767 | 0.1088 | | | −80.0000 |
| S3 | Aspheric | 9.3621 | 0.2328 | 1.55 | 56.1 | 18.2817 |
| S4 | Aspheric | 7.9098 | 0.1000 | | | 5.2123 |
| S5 | Aspheric | −100.0000 | 0.2211 | 1.67 | 20.4 | 0.0000 |
| S6 | Aspheric | −39.7862 | 0.3395 | | | 37.1745 |
| STO | Spherical | Infinite | 0.2685 | | | |
| S7 | Aspheric | −16.7623 | 0.4705 | 1.55 | 56.1 | 0.0000 |
| S8 | Aspheric | −9.3607 | 0.1149 | | | 9.8505 |
| S9 | Aspheric | 99.0000 | 0.8360 | 1.67 | 20.4 | 0.0000 |
| S10 | Aspheric | 4.5581 | 0.1776 | | | −27.9167 |
| S11 | Aspheric | 2.3777 | 0.7726 | 1.55 | 56.1 | −1.5157 |
| S12 | Aspheric | −24.2483 | 0.8292 | | | −80.0000 |
| S13 | Aspheric | 45.9234 | 0.2200 | 1.54 | 55.9 | 72.3290 |
| S14 | Aspheric | 1.6999 | 0.1702 | | | −10.1075 |
| S15 | Spherical | Infinite | 0.2000 | 1.52 | 64.2 | |
| S16 | Spherical | Infinite | 0.1000 | | | |
| S17 | Spherical | Infinite | | | | |

TABLE 14

| Surface number | A4 | A6 | A8 | A10 | A12 | A14 | A16 | A18 | A20 |
|---|---|---|---|---|---|---|---|---|---|
| S1 | 1.1392E−02 | −1.3600E−03 | −5.5090E−02 | 1.2180E−01 | −1.6178E−01 | 1.2985E−01 | −6.1190E−02 | 1.5431E−02 | −1.5900E−03 |
| S2 | −4.6600E−03 | 1.6213E−02 | 5.3300E−04 | −6.3570E−02 | 1.0683E−01 | −8.5350E−02 | 3.6205E−02 | −7.8200E−03 | 6.7800E−04 |
| S3 | −2.5760E−02 | 1.7199E−01 | −4.5081E−01 | 9.3499E−01 | −1.3999E+00 | 1.3901E+00 | −8.4960E−01 | 2.8537E−01 | −3.9990E−02 |
| S4 | −1.2545E−01 | 1.0630E−01 | −4.8100E−02 | −1.6282E−01 | 3.8069E−01 | −3.4111E−01 | 1.4129E−01 | −2.2680E−02 | 2.3400E−04 |
| S5 | −9.3560E−02 | 8.2776E−02 | 3.9158E−02 | −2.9618E−01 | 5.8681E−01 | −6.0882E−01 | 3.4607E−01 | −1.0129E−01 | 1.1913E−02 |
| S6 | −1.5680E−02 | 8.1980E−03 | 1.6847E−01 | −4.6353E−01 | 7.0269E−01 | −6.5959E−01 | 3.7189E−01 | −1.1499E−01 | 1.5076E−02 |
| S7 | −2.6540E−02 | −3.8000E−05 | −3.6850E−02 | 9.6477E−02 | −1.2741E−01 | 9.0014E−02 | −3.2830E−02 | 4.6590E−03 | 1.2000E−04 |
| S8 | −3.5070E−02 | −9.1420E−02 | 1.9614E−01 | −3.4068E−01 | 4.0890E−01 | −3.2211E−01 | 1.5671E−01 | −4.2530E−02 | 4.9030E−03 |
| S9 | −3.7870E−02 | −6.1960E−02 | 1.2117E−01 | −1.7187E−01 | 1.4181E−01 | −6.1230E−02 | 5.6650E−03 | 5.0750E−03 | −1.4200E−03 |
| S10 | −6.5830E−02 | 3.8776E−02 | −1.7330E−02 | 1.3900E−04 | 4.5060E−03 | −2.7700E−03 | 8.3600E−04 | −1.3000E−04 | 8.2800E−06 |
| S11 | −8.5040E−02 | 4.4186E−02 | −1.7220E−02 | 3.2380E−03 | 2.1200E−04 | −2.5000E−04 | 4.3100E−05 | −1.9000E−06 | −6.7000E−08 |
| S12 | 1.1473E−02 | −2.7150E−02 | 2.6426E−02 | −1.6850E−02 | 6.7350E−03 | −1.6700E−03 | 2.4700E−04 | −2.0000E−05 | 6.6300E−07 |
| S13 | −3.5346E−01 | 2.4514E−01 | −1.0881E−01 | 3.0447E−02 | −5.1500E−03 | 5.0400E−04 | −2.5000E−05 | 4.0300E−07 | 8.0800E−09 |
| S14 | −1.1317E−01 | 7.2299E−02 | −2.7930E−02 | 7.0240E−03 | −1.1800E−03 | 1.3200E−04 | −9.5000E−06 | 3.8800E−07 | −6.9000E−09 |

TABLE 15

| | |
|---|---|
| f1 (mm) | 4.86 |
| f2 (mm) | −99.00 |
| f3 (mm) | 99.11 |
| f4 (mm) | 37.98 |
| f5 (mm) | −7.20 |
| f6 (mm) | 4.01 |
| f7 (mm) | −3.29 |
| f (mm) | 4.10 |
| TTL (mm) | 5.65 |
| ImgH (mm) | 3.54 |
| FOV (°) | 80.9 |

Figure 10A:
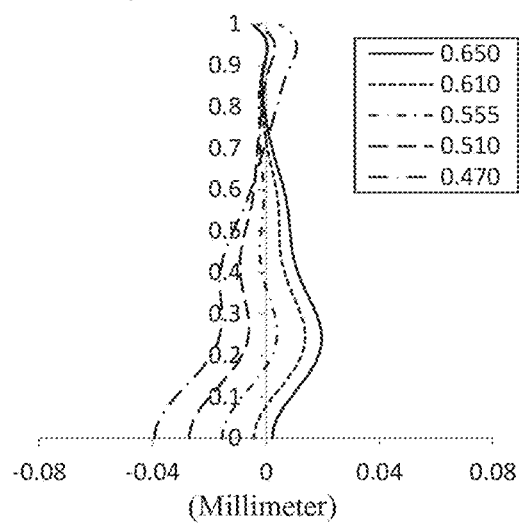
FIGS. 10A to 10D illustrate a longitudinal aberration curve, an astigmatic curve, a distortion curve, and a lateral color curve of the optical imaging lens group of the Example 5, respectively.
Figure 10B:
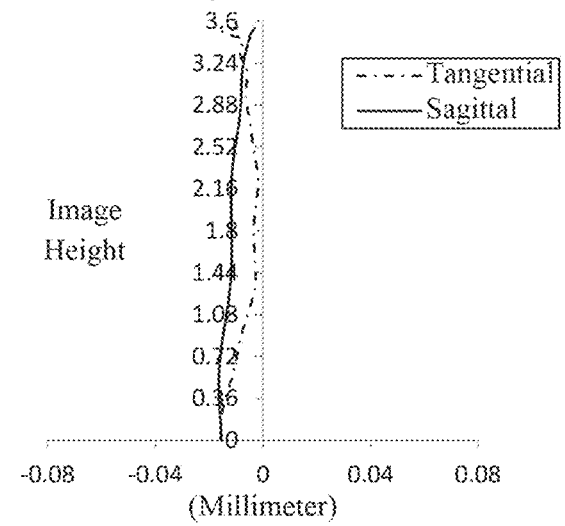
Figure 10C:
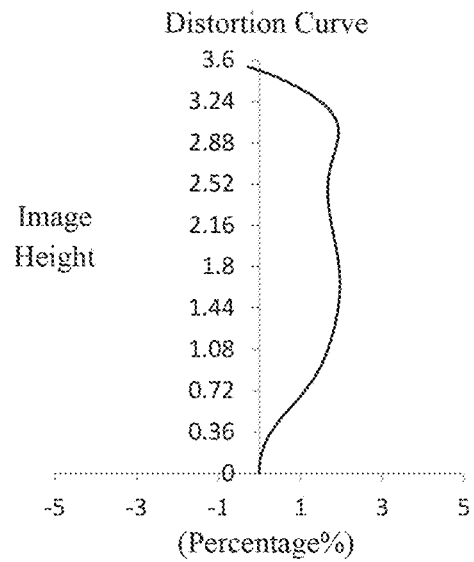
Figure 10D:
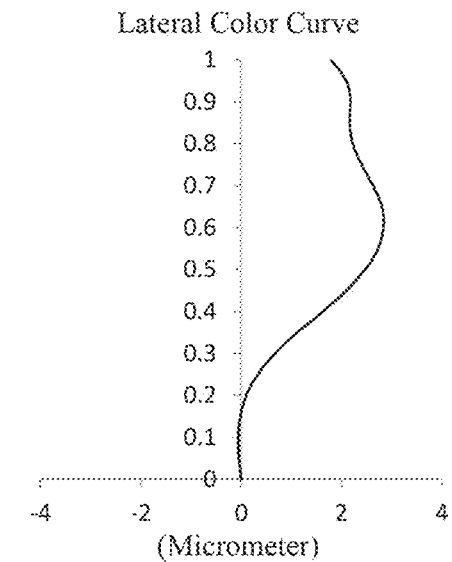

FIG. 10A illustrates a longitudinal aberration curve of the optical imaging lens group according to example 5, representing deviations of focal points converged by light of different wavelengths after passing through the lens assembly. FIG. 10B illustrates an astigmatic curve of the optical imaging lens group according to example 5, representing a curvature of a tangential plane and a curvature of a sagittal plane. FIG. 10C illustrates a distortion curve of the optical imaging lens group according to example 5, representing amounts of distortion corresponding to different image heights. FIG. 10D illustrates a lateral color curve of the optical imaging lens group according to example 5, representing deviations of different image heights on an imaging plane after light passes through the lens assembly. It can be seen from FIG. 10A to FIG. 10D that the optical imaging lens group provided in example 5 may achieve good image quality.

Example 6

Figure 11:
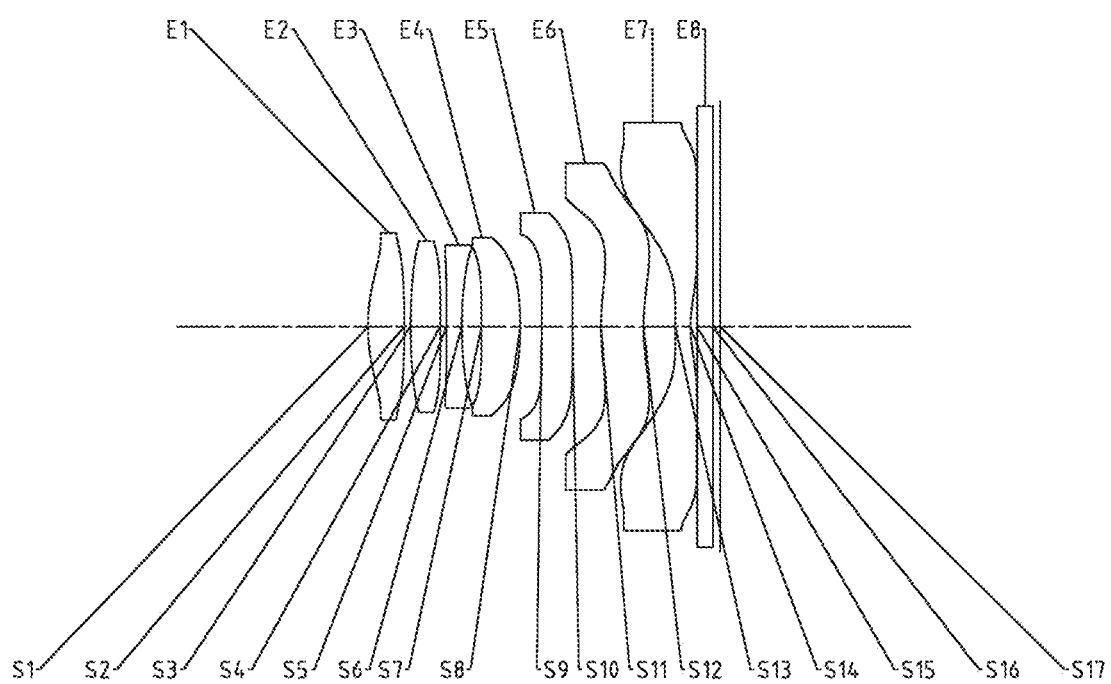
FIG. 11 illustrates a schematic structural view of an optical imaging lens group according to Example 6 of the present disclosure.

An optical imaging lens group according to example 6 of the present disclosure is described below with reference to FIG. 11 to FIG. 12D. FIG. 11 shows a schematic structural view of the optical imaging lens group according to example 6 of the present disclosure.

As shown in FIG. 11, the optical imaging lens group according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a convex surface. The second lens E2 has positive refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, the optical imaging lens group of this example may further include a stop STO (not shown) disposed between the third lens and the fourth lens to improve the image quality of the lens group.

Table 16 shows surface type, radius of curvature, thickness, material and conic coefficient of each lens of the optical imaging lens group in example 6, wherein the units for the radius of curvature and the thickness are millimeter (mm). Table 17 shows high-order coefficients applicable to each aspheric surface in example 6, wherein the surface shape of each aspheric surface may be defined by the formula (1) given in the above example 1. Table 18 shows effective focal lengths f1 to f7 of respective lens, a total effective focal length f of the optical imaging lens group, a distance TTL along the optical axis from the object-side surface S1 of the first lens E1 to the imaging plane S17, half of a diagonal length ImgH of an effective pixel area on the imaging plane S17 and a maximum field-of-view FOV in example 6.

TABLE 16

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | 2.7818 | 0.5727 | 1.54 | 55.9 | −6.3737 |
| S2 | Aspheric | −31.5016 | 0.1000 | | | 80.0000 |
| S3 | Aspheric | 8.6316 | 0.4672 | 1.55 | 56.1 | −4.1830 |
| S4 | Aspheric | 99.0000 | 0.1000 | | | −80.0000 |
| S5 | Aspheric | −99.0000 | 0.2400 | 1.67 | 20.4 | 0.0000 |
| S6 | Aspheric | 6.3340 | 0.1649 | | | 5.4843 |
| STO | Spherical | Infinite | 0.1452 | | | |
| S7 | Aspheric | −99.0000 | 0.6107 | 1.55 | 56.1 | 0.0000 |
| S8 | Aspheric | −5.0599 | 0.3387 | | | −11.3653 |
| S9 | Aspheric | −100.0000 | 0.4847 | 1.67 | 20.4 | 0.0000 |
| S10 | Aspheric | −55.1449 | 0.4495 | | | 80.0000 |
| S11 | Aspheric | 4.0194 | 0.6701 | 1.55 | 56.1 | −1.3544 |
| S12 | Aspheric | 3.5209 | 0.4993 | | | −10.6790 |
| S13 | Aspheric | 11.3697 | 0.2400 | 1.54 | 55.9 | 8.3866 |
| S14 | Aspheric | 1.9026 | 0.1035 | | | −11.7514 |
| S15 | Spherical | Infinite | 0.2495 | 1.52 | 64.2 | |
| S16 | Spherical | Infinite | 0.1138 | | | |
| S17 | Spherical | Infinite | | | | |

TABLE 17

| Surface number | A4 | A6 | A8 | A10 | A12 | A14 | A16 | A18 | A20 |
|---|---|---|---|---|---|---|---|---|---|
| S1 | 1.2947E−02 | −7.1200E−03 | −3.1820E−02 | 5.0844E−02 | −5.1390E−02 | 3.2572E−02 | −1.2250E−02 | 2.5200E−03 | −2.2000E−04 |
| S2 | −2.5460E−02 | −1.0640E−02 | 3.4673E−02 | −5.3190E−02 | 4.9472E−02 | −2.8050E−02 | 9.3780E−03 | −1.6600E−03 | 1.1900E−04 |
| S3 | −9.3000E−03 | 2.3191E−02 | −4.7690E−02 | 1.0073E−01 | −1.1953E−01 | 8.3678E−02 | −3.5050E−02 | 7.9850E−03 | −7.3000E−04 |
| S4 | −1.2060E−02 | −7.5080E−02 | 1.6365E−01 | −2.8283E−01 | 3.5331E−01 | −2.9318E−01 | 1.5076E−01 | −4.3230E−02 | 5.2810E−03 |
| S5 | 7.3670E−03 | −6.9610E−02 | 1.1730E−01 | −1.3843E−01 | 1.5222E−01 | −1.3734E−01 | 8.3926E−02 | −2.9140E−02 | 4.2580E−03 |
| S6 | 1.6662E−02 | −5.9090E−02 | 1.3203E−01 | −2.0640E−01 | 2.5354E−01 | −2.2244E−01 | 1.2725E−01 | −4.1440E−02 | 5.7210E−03 |
| S7 | −2.7150E−02 | −3.1850E−02 | 2.5620E−02 | −2.7710E−02 | 1.7380E−03 | 4.1685E−02 | −5.3060E−02 | 2.8413E−02 | −5.8100E−03 |
| S8 | −3.3680E−02 | −1.2720E−02 | −8.3910E−02 | 2.0718E−01 | −2.7664E−01 | 2.2896E−01 | −1.1531E−01 | 3.2326E−02 | −3.9000E−03 |
| S9 | 1.8144E−02 | −3.7480E−02 | −4.4610E−02 | 1.3805E−01 | −2.0977E−01 | 1.8811E−01 | −9.9580E−02 | 2.8859E−02 | −3.5700E−03 |
| S10 | 1.8057E−02 | −4.2420E−02 | 5.6686E−02 | −7.5980E−02 | 6.1355E−02 | −3.0330E−02 | 9.1710E−03 | −1.5700E−03 | 1.1600E−04 |
| S11 | −5.7730E−02 | −1.4630E−02 | 3.5676E−02 | −3.9170E−02 | 2.5484E−02 | −1.0590E−02 | 2.6320E−03 | −3.5000E−04 | 1.8700E−05 |
| S12 | −3.2180E−02 | −5.9900E−03 | 1.2610E−03 | 1.6850E−03 | −1.9800E−03 | 8.0400E−04 | −1.5000E−04 | 1.4000E−05 | −5.0000E−07 |
| S13 | −3.1744E−01 | 2.3914E−01 | −1.2298E−01 | 4.1130E−02 | −8.7000E−03 | 1.1590E−03 | −9.5000E−05 | 4.3700E−06 | −8.7000E−08 |
| S14 | −1.3631E−01 | 8.8302E−02 | −3.4810E−02 | 9.2460E−03 | −1.6600E−03 | 1.9800E−04 | −1.5000E−05 | 6.5500E−07 | −1.2000E−08 |

TABLE 18

| | |
|---|---|
| f1 (mm) | 4.79 |
| f2 (mm) | 17.29 |
| f3 (mm) | -8.92 |
| f4 (mm) | 9.75 |
| f5 (mm) | 183.68 |
| f6 (mm) | -99.00 |
| f7 (mm) | -4.29 |
| f (mm) | 4.20 |
| TTL (mm) | 5.55 |
| ImgH (mm) | 3.54 |
| FOV (°) | 79.4 |

Figure 12A:
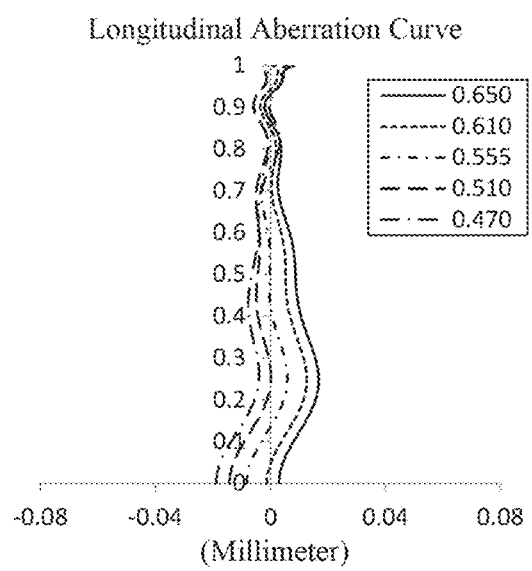
FIGS. 12A to 12D illustrate a longitudinal aberration curve, an astigmatic curve, a distortion curve, and a lateral color curve of the optical imaging lens group of the Example 6, respectively.
Figure 12B:
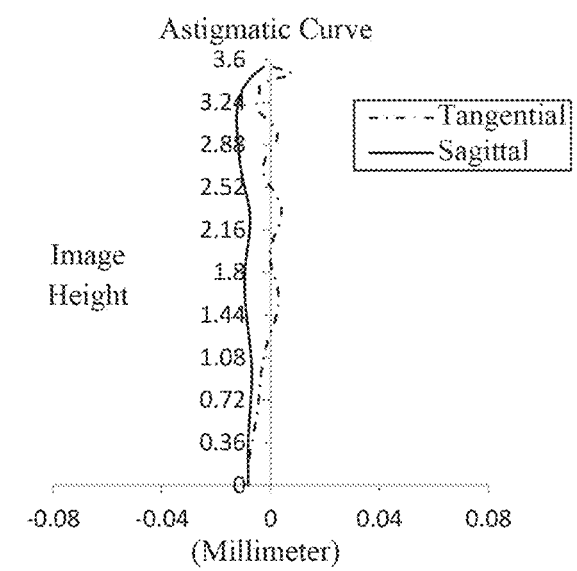
Figure 12C:
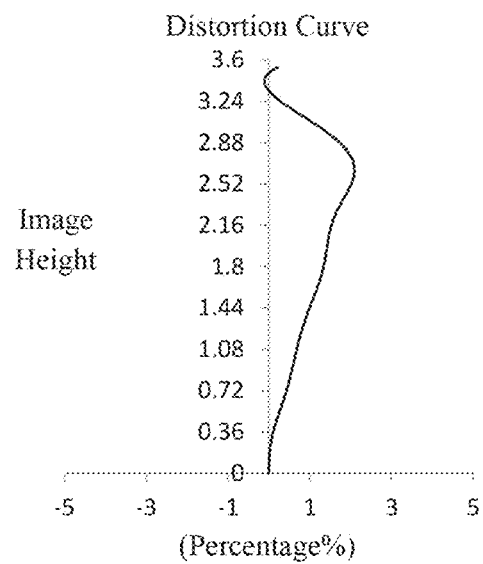
Figure 12D:
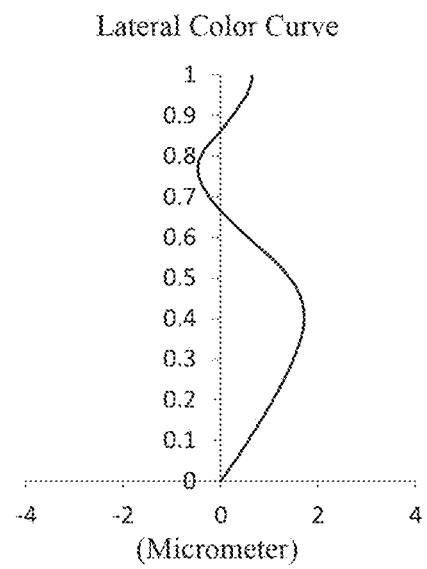

FIG. 12A illustrates a longitudinal aberration curve of the optical imaging lens group according to example 6, representing deviations of focal points converged by light of different wavelengths after passing through the lens assembly. FIG. 12B illustrates an astigmatic curve of the optical imaging lens group according to example 6, representing a curvature of a tangential plane and a curvature of a sagittal plane. FIG. 12C illustrates a distortion curve of the optical imaging lens group according to example 6, representing amounts of distortion corresponding to different image heights. FIG. 12D illustrates a lateral color curve of the optical imaging lens group according to example 6, representing deviations of different image heights on an imaging plane after light passes through the lens assembly. It can be seen from FIG. 12A to FIG. 12D that the optical imaging lens group provided in example 6 may achieve good image quality.

Example 7

Figure 13:
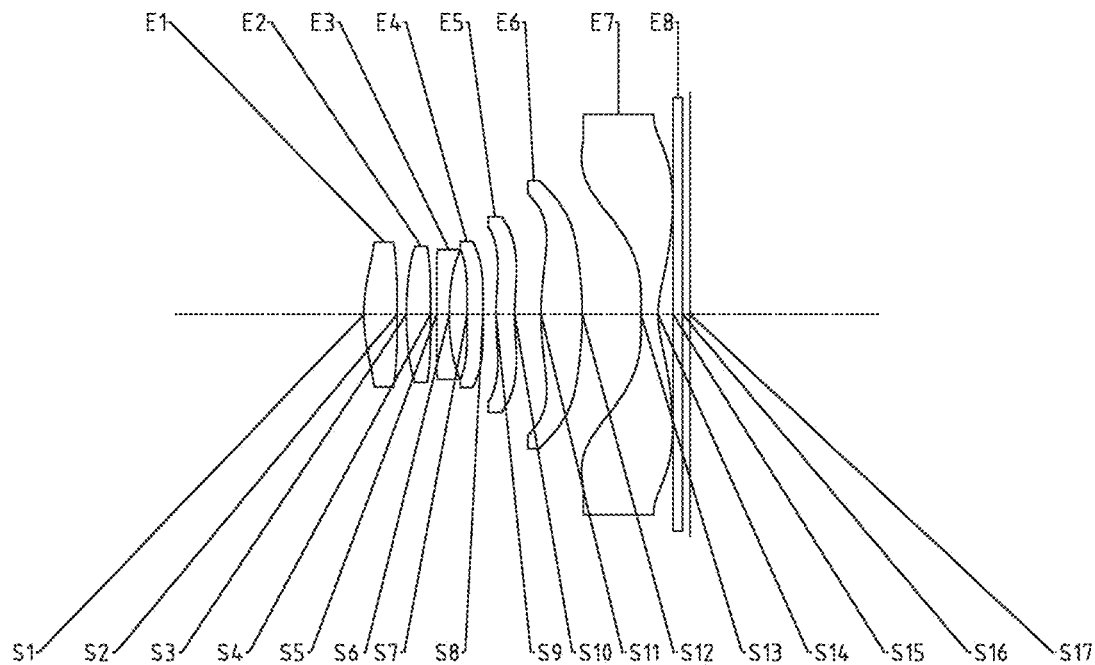
FIG. 13 illustrates a schematic structural view of an optical imaging lens group according to Example 7 of the present disclosure.

An optical imaging lens group according to example 7 of the present disclosure is described below with reference to FIG. 13 to FIG. 14D. FIG. 13 shows a schematic structural view of the optical imaging lens group according to example 7 of the present disclosure.

As shown in FIG. 13, the optical imaging lens group according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a convex surface. The second lens E2 has positive refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, the optical imaging lens group of this example may further include a stop STO (not shown) disposed between the third lens and the fourth lens to improve the image quality of the lens group.

Table 19 shows surface type, radius of curvature, thickness, material and conic coefficient of each lens of the optical imaging lens group in example 7, wherein the units for the radius of curvature and the thickness are millimeter (mm). Table 20 shows high-order coefficients applicable to each aspheric surface in example 7, wherein the surface shape of each aspheric surface may be defined by the formula (1) given in the above example 1. Table 21 shows effective focal lengths f1 to f7 of respective lens, a total effective focal length f of the optical imaging lens group, a distance TTL along the optical axis from the object-side surface S1 of the first lens E1 to the imaging plane S17, half of a diagonal length ImgH of an effective pixel area on the imaging plane S17 and a maximum field-of-view FOV in example 7.

TABLE 19

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | 2.7437 | 0.5316 | 1.54 | 55.9 | -7.2176 |
| S2 | Aspheric | -81.0340 | 0.1469 | | | 80.0000 |
| S3 | Aspheric | 5.2687 | 0.3844 | 1.55 | 56.1 | 6.4137 |
| S4 | Aspheric | 99.0000 | 0.1000 | | | -80.0000 |
| S5 | Aspheric | -90.4230 | 0.2000 | 1.67 | 20.4 | 0.0000 |
| S6 | Aspheric | 4.5814 | 0.1771 | | | 10.1526 |
| STO | Spherical | Infinite | 0.1074 | | | |
| S7 | Aspheric | -99.0000 | 0.2523 | 1.55 | 56.1 | 0.0000 |
| S8 | Aspheric | 99.0000 | 0.2077 | | | -80.0000 |
| S9 | Aspheric | 4.1266 | 0.2982 | 1.67 | 20.4 | 0.0000 |
| S10 | Aspheric | 4.2748 | 0.4188 | | | -54.9915 |
| S11 | Aspheric | 4.5011 | 0.6583 | 1.55 | 56.1 | 0.5372 |
| S12 | Aspheric | -5.3660 | 0.9357 | | | -22.1378 |
| S13 | Aspheric | 16.2768 | 0.2721 | 1.54 | 55.9 | 13.7344 |
| S14 | Aspheric | 1.4922 | 0.2395 | | | -7.5008 |
| S15 | Spherical | Infinite | 0.1500 | 1.52 | 64.2 | |
| S16 | Spherical | Infinite | 0.1201 | | | |
| S17 | Spherical | Infinite | | | | |

TABLE 20

| Surface number | A4 | A6 | A8 | A10 | A12 | A14 | A16 | A18 | A20 |
|---|---|---|---|---|---|---|---|---|---|
| S1 | 1.1364E-02 | -2.1100E-02 | -2.3100E-02 | 5.6958E-02 | -7.5410E-02 | 6.1089E-02 | -2.8450E-02 | 7.0020E-03 | -7.1000E-04 |
| S2 | -4.2550E-02 | 1.4275E-02 | -5.2400E-03 | 9.1660E-03 | -1.9300E-02 | 2.2313E-02 | -1.3040E-02 | 3.7520E-03 | -4.3000E-04 |
| S3 | -1.9220E-02 | 1.9870E-02 | 6.2026E-02 | -1.8210E-01 | 2.8572E-01 | -2.7787E-01 | 1.6134E-01 | -5.0600E-02 | 6.5450E-03 |
| S4 | -5.4340E-02 | -8.0700E-03 | 8.0539E-02 | -1.9459E-01 | 2.8968E-01 | -2.6720E-01 | 1.4951E-01 | -4.5950E-02 | 5.8820E-03 |
| S5 | 1.3189E-02 | -2.8660E-02 | 3.9521E-02 | 6.2235E-02 | -3.2088E-01 | 5.9749E-01 | -5.8055E-01 | 2.9154E-01 | -5.9930E-02 |
| S6 | 4.2028E-02 | -3.4590E-02 | 4.1099E-02 | -7.3900E-03 | -8.2520E-02 | 1.8135E-01 | -1.7539E-01 | 8.3306E-02 | -1.5760E-02 |

TABLE 20-continued

| Surface number | A4 | A6 | A8 | A10 | A12 | A14 | A16 | A18 | A20 |
|---|---|---|---|---|---|---|---|---|---|
| S7 | −6.2280E−02 | −1.9480E−02 | 8.6930E−03 | −1.3746E−01 | 3.1886E−01 | −3.4779E−01 | 1.8396E−01 | −2.3240E−02 | −8.9000E−03 |
| S8 | −1.1871E−01 | 1.0697E−01 | −2.1619E−01 | 2.4581E−01 | −1.9908E−01 | 1.2229E−01 | −5.0860E−02 | 1.4803E−02 | −2.4900E−03 |
| S9 | −1.7965E−01 | 1.5671E−01 | −1.4352E−01 | 7.3848E−02 | −1.0220E−02 | −1.6270E−02 | 1.4383E−02 | −5.0700E−03 | 6.4400E−04 |
| S10 | −8.4520E−02 | 4.3350E−03 | 6.5429E−02 | −1.2117E−01 | 1.1533E−01 | −6.7420E−02 | 2.4450E−02 | −5.0300E−03 | 4.4400E−04 |
| S11 | −3.1590E−02 | −5.5000E−03 | 1.1738E−02 | −1.6120E−02 | 1.0272E−02 | −3.6400E−03 | 7.2400E−04 | −7.3000E−05 | 2.7900E−06 |
| S12 | 1.1362E−02 | −1.6930E−02 | 2.0923E−02 | −2.3100E−02 | 1.3294E−02 | −4.3700E−03 | 8.3300E−04 | −8.6000E−05 | 3.6300E−06 |
| S13 | −3.2717E−01 | 2.5608E−01 | −1.3696E−01 | 4.7503E−02 | −1.0420E−02 | 1.4460E−03 | −1.2000E−04 | 5.9400E−06 | −1.2000E−07 |
| S14 | −1.1177E−01 | 7.4686E−02 | −3.0780E−02 | 8.1010E−03 | −1.4000E−03 | 1.5700E−04 | −1.1000E−05 | 4.4800E−07 | −7.9000E−09 |

TABLE 21

| | |
|---|---|
| f1 (mm) | 4.95 |
| f2 (mm) | 10.18 |
| f3 (mm) | −6.54 |
| f4 (mm) | −90.63 |
| f5 (mm) | 99.00 |
| f6 (mm) | 4.59 |
| f7 (mm) | −3.08 |
| f (mm) | 3.99 |
| TTL (mm) | 5.20 |
| ImgH (mm) | 3.54 |
| FOV (°) | 81.6 |

Figure 14A:
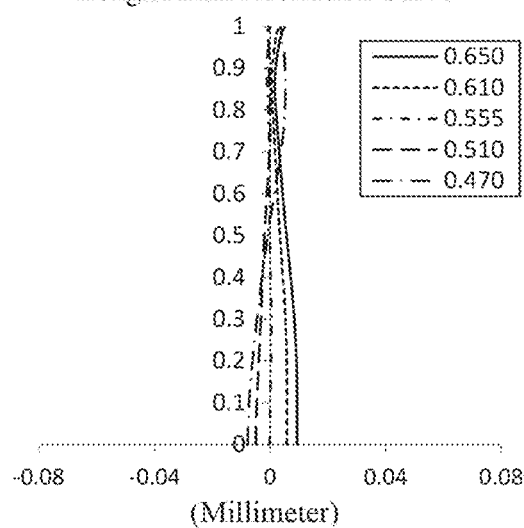
FIGS. 14A to 14D illustrate a longitudinal aberration curve, an astigmatic curve, a distortion curve, and a lateral color curve of the optical imaging lens group of the Example 7, respectively.
Figure 14B:
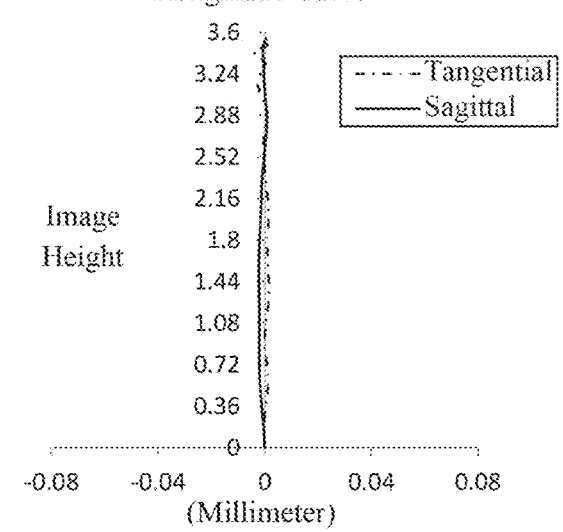
Figure 14C:
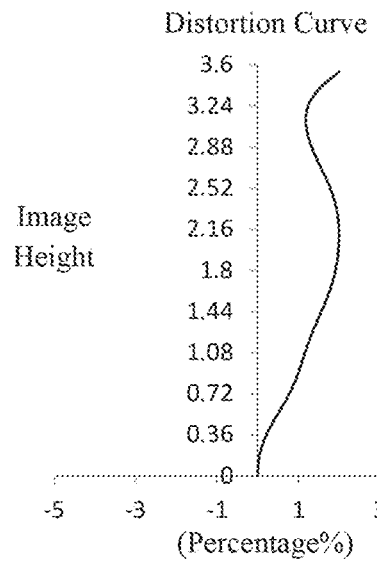
Figure 14D:
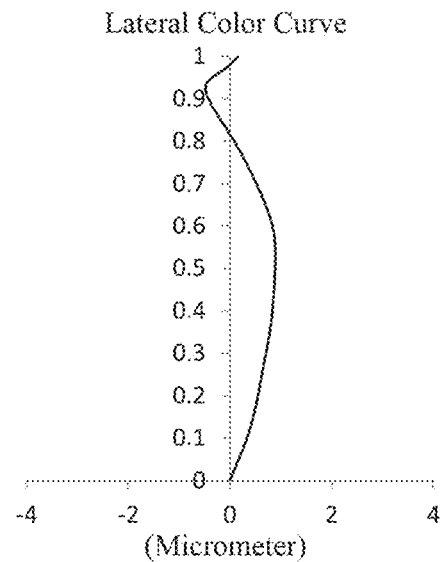

FIG. 14A illustrates a longitudinal aberration curve of the optical imaging lens group according to example 7, representing deviations of focal points converged by light of different wavelengths after passing through the lens assembly. FIG. 14B illustrates an astigmatic curve of the optical imaging lens group according to example 7, representing a curvature of a tangential plane and a curvature of a sagittal plane. FIG. 14C illustrates a distortion curve of the optical imaging lens group according to example 7, representing amounts of distortion corresponding to different image heights. FIG. 14D illustrates a lateral color curve of the optical imaging lens group according to example 7, representing deviations of different image heights on an imaging plane after light passes through the lens assembly. It can be seen from FIG. 14A to FIG. 14D that the optical imaging lens group provided in example 7 may achieve good image quality.

Example 8

Figure 15:
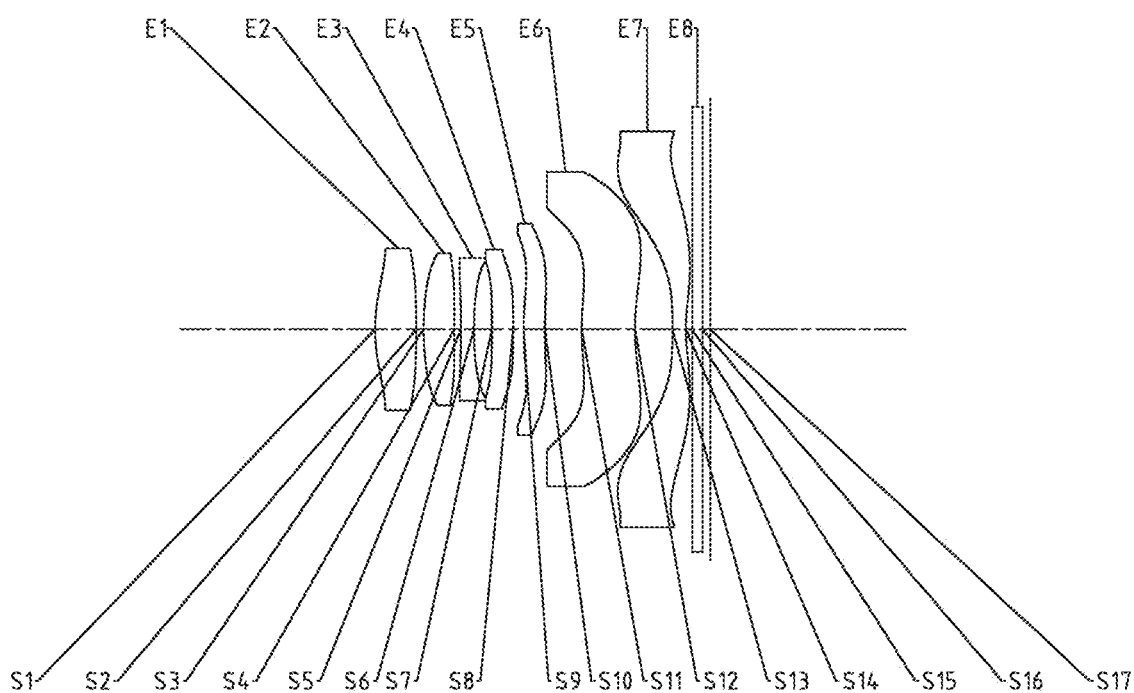
FIG. 15 illustrates a schematic structural view of an optical imaging lens group according to Example 8 of the present disclosure.

An optical imaging lens group according to example 8 of the present disclosure is described below with reference to FIG. 15 to FIG. 16D. FIG. 15 shows a schematic structural view of the optical imaging lens group according to example 8 of the present disclosure.

As shown in FIG. 15, the optical imaging lens group according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a convex surface. The second lens E2 has positive refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a concave surface. The sixth lens E6 has negative refractive power, an object-side surface S11 thereof is a convex surface, and an image-side surface S12 thereof is a concave surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, the optical imaging lens group of this example may further include a stop STO (not shown) disposed between the third lens and the fourth lens to improve the image quality of the lens group.

Table 22 shows surface type, radius of curvature, thickness, material and conic coefficient of each lens of the optical imaging lens group in example 8, wherein the units for the radius of curvature and the thickness are millimeter (mm). Table 23 shows high-order coefficients applicable to each aspheric surface in example 8, wherein the surface shape of each aspheric surface may be defined by the formula (1) given in the above example 1. Table 24 shows effective focal lengths f1 to f7 of respective lens, a total effective focal length f of the optical imaging lens group, a distance TTL along the optical axis from the object-side surface S1 of the first lens E1 to the imaging plane S17, half of a diagonal length ImgH of an effective pixel area on the imaging plane S17 and a maximum field-of-view FOV in example 8.

TABLE 22

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| S1 | Aspheric | 2.7007 | 0.6292 | 1.54 | 55.9 | −8.5194 |
| S2 | Aspheric | −99.0000 | 0.1159 | | | 80.0000 |
| S3 | Aspheric | 4.4563 | 0.4732 | 1.55 | 56.1 | 7.6921 |
| S4 | Aspheric | 99.0000 | 0.1000 | | | −80.0000 |
| S5 | Aspheric | −18.7791 | 0.2000 | 1.67 | 20.4 | 0.0000 |
| S6 | Aspheric | 5.5264 | 0.1757 | | | 11.8274 |
| STO | Spherical | Infinite | 0.1000 | | | |
| S7 | Aspheric | −99.0000 | 0.3261 | 1.55 | 56.1 | 0.0000 |
| S8 | Aspheric | 99.0000 | 0.1599 | | | −80.0000 |
| S9 | Aspheric | 3.6428 | 0.3291 | 1.67 | 20.4 | 0.0000 |
| S10 | Aspheric | 6.8481 | 0.5652 | | | −62.8787 |
| S11 | Aspheric | 4.1791 | 0.8180 | 1.55 | 56.1 | −12.8932 |
| S12 | Aspheric | 3.6110 | 0.5754 | | | −7.7160 |
| S13 | Aspheric | −89.0403 | 0.2057 | 1.54 | 55.9 | 80.0000 |

TABLE 22-continued

| Surface number | Surface type | Radius of curvature | Thickness | Material Refractive index | Abbe number | Conic coefficient |
|---|---|---|---|---|---|---|
| S14 | Aspheric | 2.4602 | 0.1000 | | | −14.5275 |
| S15 | Spherical | Infinite | 0.1565 | 1.52 | 64.2 | |
| S16 | Spherical | Infinite | 0.1200 | | | |
| S17 | Spherical | Infinite | | | | |

TABLE 23

| Surface number | A4 | A6 | A8 | A10 | A12 | A14 | A16 | A18 | A20 |
|---|---|---|---|---|---|---|---|---|---|
| S1  |  1.4891E−02 | −3.7610E−02 |  4.5570E−03 | −6.7000E−05 |  5.0230E−03 | −7.0300E−03 |  5.5310E−03 | −2.1700E−03 |  3.1800E−04 |
| S2  | −7.1720E−02 |  2.9102E−02 |  1.2011E−02 | −4.9630E−02 |  7.3745E−02 | −6.6930E−02 |  3.7628E−02 | −1.1720E−02 |  1.5130E−03 |
| S3  | −3.5190E−02 |  5.8738E−02 | −4.3850E−02 |  1.0500E−01 | −1.7262E−01 |  1.5213E−01 | −7.4190E−02 |  1.8686E−02 | −1.8700E−03 |
| S4  | −5.2680E−02 | −6.6600E−03 |  2.8403E−02 |  5.2770E−03 | −8.4100E−02 |  1.2815E−01 | −8.6810E−02 |  2.7832E−02 | −3.4400E−03 |
| S5  | −1.3160E−02 |  1.2338E−02 | −4.1430E−02 |  2.0876E−01 | −4.4873E−01 |  5.3907E−01 | −3.5434E−01 |  1.1608E−01 | −1.4220E−02 |
| S6  |  2.5870E−02 | −5.9200E−03 |  9.2213E−02 | −3.1909E−01 |  7.1915E−01 | −1.0063E+00 |  8.6597E−01 | −4.0999E−01 |  8.1344E−02 |
| S7  | −7.8920E−02 |  8.3681E−02 | −3.4705E−01 |  6.6751E−01 | −7.6772E−01 |  4.8513E−01 | −1.0616E−01 | −1.9250E−02 |  6.0430E−03 |
| S8  | −1.9537E−01 |  3.7198E−01 | −9.2519E−01 |  1.5214E+00 | −1.7030E+00 |  1.2948E+00 | −6.3102E−01 |  1.8298E−01 | −2.5160E−02 |
| S9  | −2.0202E−01 |  3.5187E−01 | −6.5477E−01 |  8.4483E−01 | −7.8457E−01 |  5.0081E−01 | −2.0183E−01 |  4.5762E−02 | −4.4600E−03 |
| S10 | −1.1632E−01 |  1.6099E−01 | −2.0082E−01 |  1.5648E−01 | −8.6600E−02 |  3.3254E−02 | −7.4700E−03 |  7.2500E−04 | −5.9000E−06 |
| S11 | −9.7070E−02 |  1.5464E−02 |  1.2486E−02 | −3.0190E−02 |  2.7758E−02 | −1.4680E−02 |  4.4150E−03 | −6.9000E−04 |  4.2500E−05 |
| S12 | −4.5720E−02 |  4.2160E−03 |  1.9450E−03 | −2.5900E−03 |  1.0780E−03 | −2.8000E−04 |  4.9200E−05 | −5.3000E−06 |  2.3700E−07 |
| S13 | −2.6350E−01 |  2.2303E−01 | −1.2153E−01 |  4.1290E−02 | −8.7300E−03 |  1.1580E−03 | −9.4000E−05 |  4.3000E−06 | −8.5000E−08 |
| S14 | −1.6327E−01 |  1.2513E−01 | −6.0670E−02 |  1.8505E−02 | −3.5800E−03 |  4.3700E−04 | −3.0000E−05 |  1.3700E−06 | −2.5000E−08 |

TABLE 24

| | |
|---|---|
| f1 (mm) | 4.91 |
| f2 (mm) | 8.53 |
| f3 (mm) | −6.39 |
| f4 (mm) | −90.62 |
| f5 (mm) | 11.22 |
| f6 (mm) | −98.99 |
| f7 (mm) | −4.46 |
| f (mm) | 4.12 |
| TTL (mm) | 5.15 |
| ImgH (mm) | 3.54 |
| FOV (°) | 79.7 |

Figure 16A:
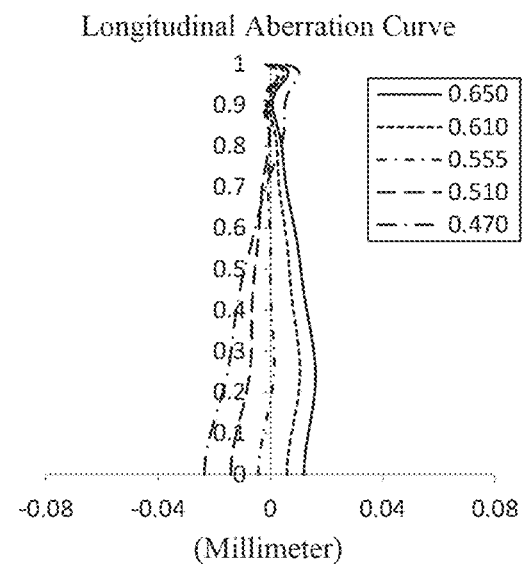
FIGS. 16A to 16D illustrate a longitudinal aberration curve, an astigmatic curve, a distortion curve, and a lateral color curve of the optical imaging lens group of the Example 8, respectively.
Figure 16B:
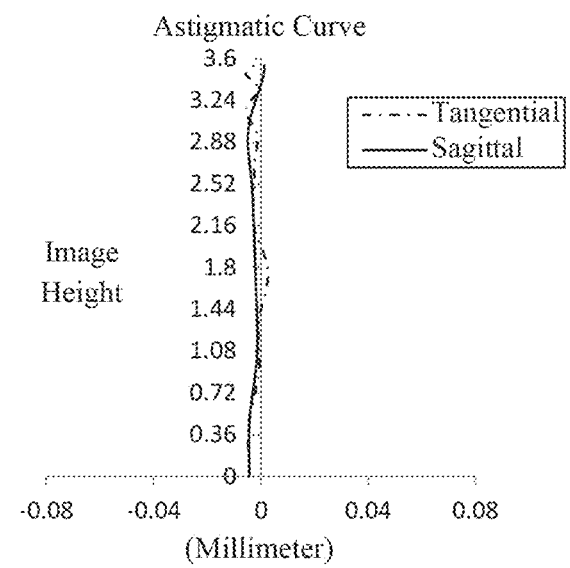
Figure 16C:
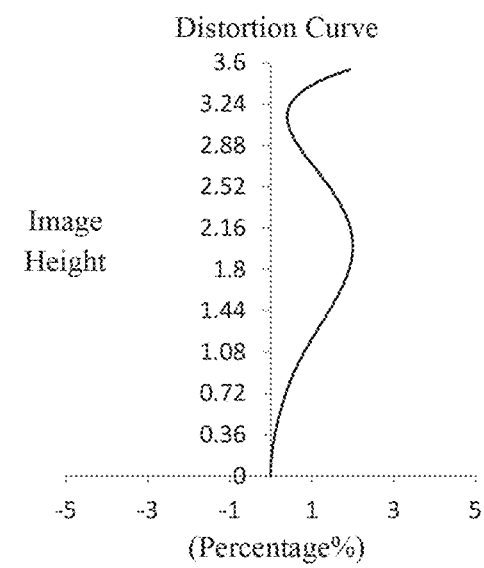
Figure 16D:
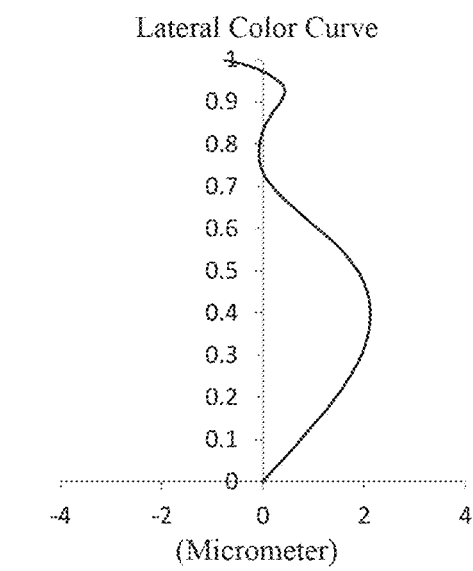

FIG. 16A illustrates a longitudinal aberration curve of the optical imaging lens group according to example 8, representing deviations of focal points converged by light of different wavelengths after passing through the lens assembly. FIG. 16B illustrates an astigmatic curve of the optical imaging lens group according to example 8, representing a curvature of a tangential plane and a curvature of a sagittal plane. FIG. 16C illustrates a distortion curve of the optical imaging lens group according to example 8, representing amounts of distortion corresponding to different image heights. FIG. 16D illustrates a lateral color curve of the optical imaging lens group according to example 8, representing deviations of different image heights on an imaging plane after light passes through the lens assembly. It can be seen from FIG. 16A to FIG. 16D that the optical imaging lens group provided in example 8 may achieve good image quality.

Example 9

Figure 17:
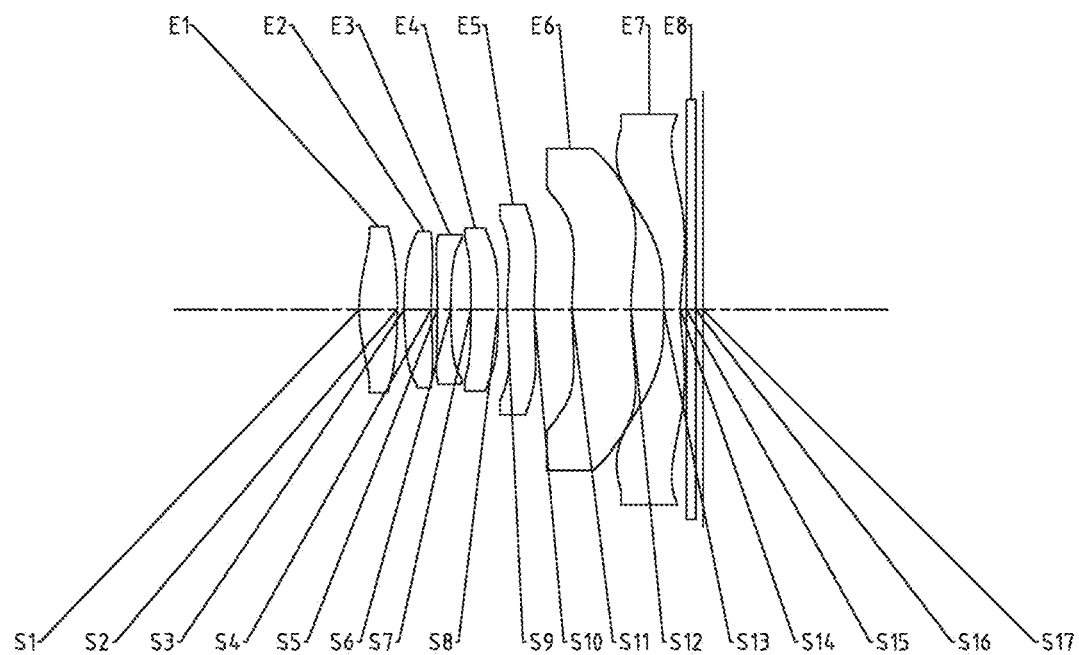
FIG. 17 illustrates a schematic structural view of an optical imaging lens group according to Example 9 of the present disclosure.

An optical imaging lens group according to example 9 of the present disclosure is described below with reference to FIG. 17 to FIG. 18D. FIG. 17 shows a schematic structural view of the optical imaging lens group according to example 9 of the present disclosure.

As shown in FIG. 17, the optical imaging lens group according to an exemplary embodiment of the present disclosure includes a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a concave surface. The sixth lens E6 has negative refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Optionally, the optical imaging lens group of this example may further include a stop STO (not shown) disposed between the third lens and the fourth lens to improve the image quality of the lens group.

Table 25 shows surface type, radius of curvature, thickness, material and conic coefficient of each lens of the optical imaging lens group in example 9, wherein the units for the radius of curvature and the thickness are millimeter (mm). Table 26 shows high-order coefficients applicable to each aspheric surface in example 9, wherein the surface shape of each aspheric surface may be defined by the formula (1) given in the above example 1. Table 27 shows effective focal lengths f1 to f7 of respective lens, a total effective focal length f of the optical imaging lens group, a distance TTL along the optical axis from the object-side surface S1 of the first lens E1 to the imaging plane S17, half of a diagonal length ImgH of an effective pixel area on the imaging plane S17 and a maximum field-of-view FOV in example 9.

TABLE 25

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | 2.6546 | 0.6224 | 1.54 | 55.9 | −7.9620 |
| S2 | Aspheric | −14.3177 | 0.1091 | | | −80.0000 |
| S3 | Aspheric | 5.9678 | 0.4386 | 1.55 | 56.1 | 9.8057 |
| S4 | Aspheric | 5.2349 | 0.1000 | | | −80.0000 |
| S5 | Aspheric | −55.0509 | 0.2200 | 1.67 | 20.4 | 0.0000 |
| S6 | Aspheric | 12.1046 | 0.1927 | | | 72.7696 |
| STO | Spherical | Infinite | 0.1339 | | | |
| S7 | Aspheric | −99.0000 | 0.4439 | 1.55 | 56.1 | 0.0000 |
| S8 | Aspheric | 99.0000 | 0.1403 | | | 80.0000 |
| S9 | Aspheric | 3.8122 | 0.4429 | 1.67 | 20.4 | 0.0000 |
| S10 | Aspheric | 6.0053 | 0.6149 | | | −32.6290 |
| S11 | Aspheric | 5.3103 | 0.9604 | 1.55 | 56.1 | −0.8076 |
| S12 | Aspheric | 4.5264 | 0.5302 | | | −6.9846 |
| S13 | Aspheric | 46.6757 | 0.2705 | 1.54 | 55.9 | 80.0000 |
| S14 | Aspheric | 2.7060 | 0.1000 | | | −10.7039 |
| S15 | Spherical | Infinite | 0.1500 | 1.52 | 64.2 | |
| S16 | Spherical | Infinite | 0.1200 | | | |
| S17 | Spherical | Infinite | | | | |

TABLE 27

| | |
|---|---|
| f1 (mm) | 4.23 |
| f2 (mm) | −99.00 |
| f3 (mm) | −14.87 |
| f4 (mm) | −90.60 |
| f5 (mm) | 14.49 |
| f6 (mm) | −99.00 |
| f7 (mm) | −5.36 |
| f (mm) | 4.45 |
| TTL (mm) | 5.59 |
| ImgH (mm) | 3.54 |
| FOV (°) | 76.3 |

Figures 18A, 18B:
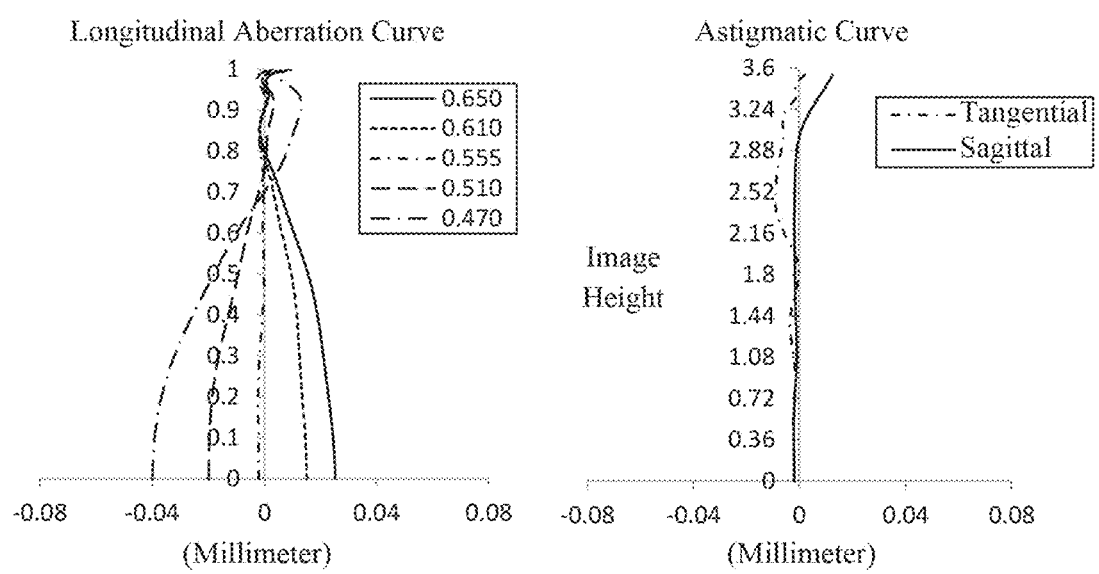
FIGS. 18A to 18D illustrate a longitudinal aberration curve, an astigmatic curve, a distortion curve, and a lateral color curve of the optical imaging lens group of the Example 9, respectively.
Figure 18C:
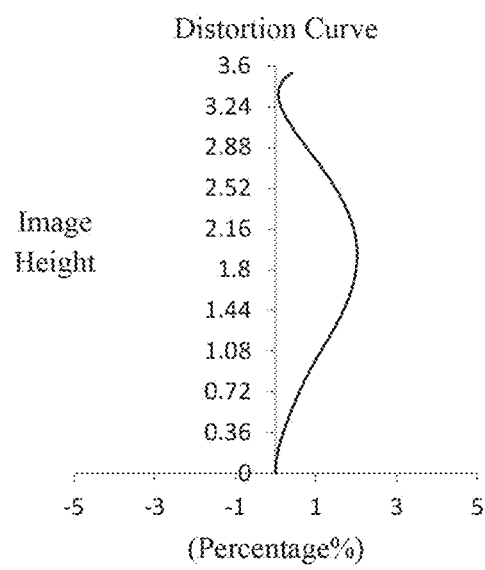
Figure 18D:
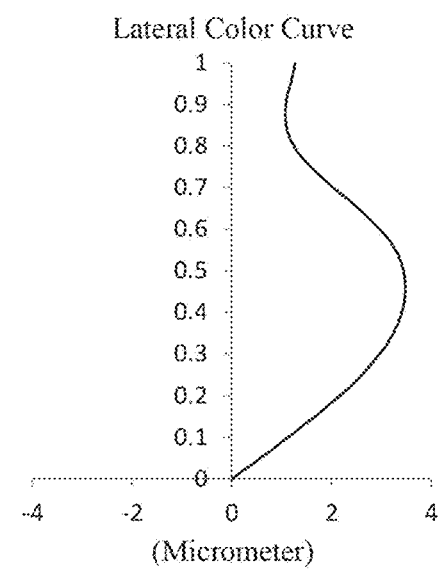

FIG. 18A illustrates a longitudinal aberration curve of the optical imaging lens group according to example 9, representing deviations of focal points converged by light of different wavelengths after passing through the lens assembly. FIG. 18B illustrates an astigmatic curve of the optical imaging lens group according to example 9, representing a curvature of a tangential plane and a curvature of a sagittal plane. FIG. 18C illustrates a distortion curve of the optical imaging lens group according to example 9, representing amounts of distortion corresponding to different image heights. FIG. 18D illustrates a lateral color curve of the optical imaging lens group according to example 9, representing deviations of different image heights on an imaging plane after light passes through the lens assembly. It can be seen from FIG. 18A to FIG. 18D that the optical imaging lens group provided in example 9 may achieve good image quality.

In view of the above, examples 1 to 9 respectively satisfy the relationship shown in Table 28.

TABLE 26

| Surface number | A4 | A6 | A8 | A10 | A12 | A14 | A16 | A18 | A20 |
|---|---|---|---|---|---|---|---|---|---|
| S1 | 2.1666E−02 | −4.4770E−02 | 2.6098E−02 | −3.1760E−02 | 2.7491E−02 | −1.3950E−02 | 4.7940E−03 | −1.1500E−03 | 1.3900E−04 |
| S2 | −8.3350E−02 | 9.9781E−02 | −1.0820E−01 | 7.3031E−02 | −1.5360E−02 | −1.8390E−02 | 1.7425E−02 | −6.1700E−03 | 8.2600E−04 |
| S3 | −7.2590E−02 | 1.5696E−01 | −1.3635E−01 | 1.0240E−01 | −5.5810E−02 | 1.7015E−02 | −1.6400E−03 | −6.0000E−04 | 1.3300E−04 |
| S4 | −4.4600E−02 | −3.7140E−02 | 1.0731E−01 | −2.1139E−01 | 2.9042E−01 | −2.3057E−01 | 1.0273E−01 | −2.4480E−02 | 2.4940E−03 |
| S5 | −2.8820E−02 | 2.1725E−02 | 1.4214E−02 | −1.0475E−01 | 2.3443E−01 | −2.4115E−01 | 1.3516E−01 | −4.1260E−02 | 5.5170E−03 |
| S6 | 3.4609E−02 | 1.6081E−02 | 4.1617E−02 | −1.8784E−01 | 3.9998E−01 | −4.8089E−01 | 3.4317E−01 | −1.3334E−01 | 2.1847E−02 |
| S7 | −5.9010E−02 | 7.8030E−02 | −2.4259E−01 | 3.9683E−01 | −4.2412E−01 | 2.9365E−01 | −1.2897E−01 | 3.8624E−02 | −6.7200E−03 |
| S8 | −2.0046E−01 | 3.7697E−01 | −7.6243E−01 | 1.0468E+00 | −9.9713E−01 | 6.5420E−01 | −2.8117E−01 | 7.2610E−02 | −8.7000E−03 |
| S9 | −1.9582E−01 | 3.0066E−01 | −4.9793E−01 | 5.6573E−01 | −4.5689E−01 | 2.5306E−01 | −8.8860E−02 | 1.7697E−02 | −1.5400E−03 |
| S10 | −8.2050E−02 | 8.7597E−02 | −8.8160E−02 | 4.5172E−02 | −8.1800E−03 | −4.0600E−03 | 3.1300E−03 | −8.1000E−04 | 7.7100E−05 |
| S11 | −7.8630E−02 | 1.4711E−02 | 1.1718E−02 | −2.4340E−02 | 1.9335E−02 | −8.9400E−03 | 2.4210E−03 | −3.5000E−04 | 2.0700E−05 |
| S12 | −5.0130E−02 | 2.0123E−02 | −9.6700E−03 | 3.3970E−03 | −1.0200E−03 | 2.2900E−04 | −3.1000E−05 | 2.2300E−06 | −6.5000E−08 |
| S13 | −2.2989E−01 | 1.6711E−01 | −8.0990E−02 | 2.5276E−02 | −4.9700E−03 | 6.1600E−04 | −4.7000E−05 | 2.0100E−06 | −3.7000E−08 |
| S14 | −1.4838E−01 | 1.0769E−01 | −4.8930E−02 | 1.3884E−02 | −2.4900E−03 | 2.8200E−04 | −2.0000E−05 | 7.6500E−07 | −1.3000E−08 |

TABLE 28

| Condition/Example | 1 | 2 | 3 | 4 | 5 | 6 | 7 | 8 | 9 |
|---|---|---|---|---|---|---|---|---|---|
| f/EPD | 1.79 | 1.84 | 1.59 | 1.50 | 1.64 | 1.51 | 1.74 | 1.69 | 1.66 |
| f1/T67 | 6.04 | 5.96 | 5.02 | 4.07 | 5.86 | 9.59 | 5.30 | 8.53 | 7.97 |
| f7/R14 | −2.01 | −1.30 | −2.07 | −2.04 | −1.94 | −2.26 | −2.06 | −1.81 | −1.98 |
| TTL/ImgH | 1.51 | 1.41 | 1.48 | 1.50 | 1.60 | 1.57 | 1.47 | 1.45 | 1.58 |
| R11/R3 | 0.38 | 0.61 | 0.32 | 0.12 | 0.25 | 0.47 | 0.85 | 0.94 | 0.89 |
| |(R2 − R5)/(R2 + R5)| | 0.34 | 0.33 | 0.33 | 0.83 | 0.47 | 0.52 | 0.05 | 0.68 | 0.59 |
| f/R1 | 1.38 | 1.45 | 1.44 | 1.43 | 1.47 | 1.51 | 1.45 | 1.53 | 1.68 |
| CT4/CT5 | 1.82 | 1.43 | 0.73 | 0.73 | 0.56 | 1.26 | 0.85 | 0.99 | 1.00 |
| ECT/TTL | 0.54 | 0.50 | 0.53 | 0.49 | 0.57 | 0.59 | 0.50 | 0.58 | 0.61 |
| DT71/DT11 | 2.39 | 2.42 | 2.24 | 1.99 | 2.11 | 1.96 | 2.40 | 2.26 | 2.18 |
| FOV (°) | 82.8 | 84.2 | 82.4 | 81.4 | 80.9 | 79.4 | 81.6 | 79.7 | 76.3 |
| T56/CT6 | 0.44 | 0.76 | 0.49 | 0.52 | 0.23 | 0.67 | 0.64 | 0.69 | 0.64 |
| ET6/CT6 | 0.57 | 0.65 | 0.35 | 0.40 | 0.34 | 0.89 | 0.29 | 0.70 | 0.78 |
| CT7/ET7 | 0.18 | 0.20 | 0.24 | 0.26 | 0.17 | 0.27 | 0.24 | 0.25 | 0.29 |
| |f/f4| + |f/f5| | 0.58 | 0.39 | 0.20 | 0.19 | 0.68 | 0.45 | 0.08 | 0.41 | 0.36 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens group, comprising: a first lens, a second lens, a third lens, a fourth lens, a fifth lens, a sixth lens and a seventh lens, which are sequentially arranged from an object side to an image side of the optical imaging lens group along an optical axis,
wherein,
the first lens has positive refractive power, and both an object-side surface and an image-side surface of the first lens are convex surfaces;
the second lens has refractive power, and an object-side surface of the second lens is a convex surface;
the third lens has refractive power, and an object-side surface of the third lens is a concave surface;
the fourth lens has refractive power;
the fifth lens has refractive power;
the sixth lens has refractive power, and an object-side surface of the sixth lens is a convex surface; and
the seventh lens has negative refractive power;
wherein 0.2<ET6/CT6<0.9, where ET6 is an edge thickness of the sixth lens, and CT6 is a center thickness of the sixth lens along the optical axis, and
wherein 0<R11/R3<1,
where R11 is a radius of curvature of the object-side surface of the sixth lens, and R3 is a radius of curvature of the object-side surface of the second lens.

2. The optical imaging lens group according to claim 1, wherein −2.5<f7/R14<−1.0,
where f7 is an effective focal length of the seventh lens, and R14 is a radius of curvature of an image-side surface of the seventh lens.

3. The optical imaging lens group according to claim 1, wherein |(R2−R5)/(R2+R5)|<1,
where R2 is a radius of curvature of the image-side surface of the first lens, and R5 is a radius of curvature of the object-side surface of the third lens.

4. The optical imaging lens group according to claim 1, wherein 1<f/R1<2,
where f is a total effective focal length of the optical imaging lens group, and R1 is a radius of curvature of the object-side surface of the first lens.

5. The optical imaging lens group according to claim 1, wherein 1.5<DT71/DT11<2.5,
where DT71 is a maximum effective radius of an object-side surface of the seventh lens, and DT11 is a maximum effective radius of the object-side surface of the first lens.

6. The optical imaging lens group according to claim 1, wherein 0.2<T56/CT6<0.8,
where T56 is a spaced interval between the fifth lens and the sixth lens along the optical axis, and CT6 is the center thickness of the sixth lens along the optical axis.

7. The optical imaging lens group according to claim 1, wherein |f/f4|+|f/f5|<0.7,
where f is a total effective focal length of the optical imaging lens group, f4 is an effective focal length of the fourth lens, and f5 is an effective focal length of the fifth lens.

8. The optical imaging lens group according to claim 1, wherein TTL/ImgH≤1.6,
where TTL is a spaced interval along the optical axis from the object-side surface of the first lens to an imaging plane of the optical imaging lens group, and ImgH is half of a diagonal length of an effective pixel area on the imaging plane of the optical imaging lens group.

9. The optical imaging lens group according to claim 1, wherein 0.4<ΣCT/TTL<0.7,
where ΣCT is a sum of the center thicknesses of the first lens to the seventh lens along the optical axis, and TTL is a spaced interval along the optical axis from the object-side surface of the first lens to an imaging plane of the optical imaging lens group.

10. The optical imaging lens group according to claim 1, wherein 75°<FOV<85°,
where FOV is a maximum field-of-view of the optical imaging lens group.

11. An optical imaging lens group, comprising: a first lens, a second lens, a third lens, a fourth lens, a fifth lens, a sixth lens and a seventh lens, which are sequentially arranged from an object side to an image side of the optical imaging lens group along an optical axis,
wherein,
the first lens has positive refractive power, and both an object-side surface and an image-side surface of the first lens are convex surfaces;
the second lens has refractive power, and an object-side surface of the second lens is a convex surface;
the third lens has refractive power, and an object-side surface of the third lens is a concave surface;
the fourth lens has refractive power;
the fifth lens has refractive power;
the sixth lens has refractive power, and an object-side surface of the sixth lens is a convex surface; and
the seventh lens has negative refractive power;
wherein 4<f1/T67<10, where f1 is an effective focal length of the first lens, and T67 is a spaced interval between the sixth lens and the seventh lens along the optical axis, and
wherein 0<R11/R3<1,
where R11 is a radius of curvature of the object-side surface of the sixth lens, and R3 is a radius of curvature of the object-side surface of the second lens.

12. The optical imaging lens group according to claim 11, wherein 0.4<ΣCT/TTL<0.7,
where ΣCT is a sum of the center thicknesses of the first lens to the seventh lens along the optical axis, and TTL is a spaced interval along the optical axis from the object-side surface of the first lens to an imaging plane of the optical imaging lens group.

13. The optical imaging lens group according to claim 12, wherein 0.5<CT4 ΣCT5<2,
where CT4 is a center thickness of the fourth lens along the optical axis, and CT5 is a center thickness of the fifth lens along the optical axis.

14. The optical imaging lens group according to claim 12, wherein 0.1<CT7/ET7<0.4,
where CT7 is a center thickness of the seventh lens along the optical axis, and ET7 is an edge thickness of the seventh lens.

15. The optical imaging lens group according to claim 12, wherein 0.2<T56/CT6<0.8,
where T56 is a spaced interval between the fifth lens and the sixth lens along the optical axis, and CT6 is a center thickness of the sixth lens along the optical axis.

16. The optical imaging lens group according to claim 12, wherein TTL/ImgH≤1.6,
where TTL is the spaced interval along the optical axis from the object-side surface of the first lens to the imaging plane of the optical imaging lens group, and ImgH is half of a diagonal length of an effective pixel area on the imaging plane of the optical imaging lens group.

17. The optical imaging lens group according to claim 11, wherein f/EPD<2.0,
where f is a total effective focal length of the optical imaging lens group, and EPD is an entrance pupil diameter of the optical imaging lens group.

18. The optical imaging lens group according to claim 17, wherein |f/f4|+|f/f5|<0.7,
where f is the total effective focal length of the optical imaging lens group, f4 is an effective focal length of the fourth lens, and f5 is an effective focal length of the fifth lens.

19. The optical imaging lens group according to claim 17, wherein −2.5<f7/R14<−1.0,
where f7 is an effective focal length of the seventh lens, and R14 is a radius of curvature of an image-side surface of the seventh lens.

* * * * *